(12) United States Patent
Askem et al.

(10) Patent No.: US 12,514,970 B2
(45) Date of Patent: Jan. 6, 2026

(54) SELF-TESTING FOR NEGATIVE PRESSURE WOUND THERAPY DEVICES

(71) Applicant: T.J.Smith and Nephew, Limited, Hull (GB)

(72) Inventors: Ben Alan Askem, Leeds (GB); David Michael Elder, Hull (GB); Danielle Susan Johnson, Hull (GB); Camilo Patrick Madriz, Bristol (GB); Andrea Maggiore, Hull (GB); Christopher John Webb, South Ferriby (GB)

(73) Assignee: T.J.Smith and Nephew, Limited, Hull (GB)

( * ) Notice: Subject to any disclaimer, the term of this patent is extended or adjusted under 35 U.S.C. 154(b) by 672 days.

(21) Appl. No.: 17/790,650

(22) PCT Filed: Mar. 23, 2021

(86) PCT No.: PCT/EP2021/057425
§ 371 (c)(1),
(2) Date: Jul. 1, 2022

(87) PCT Pub. No.: WO2021/191203
PCT Pub. Date: Sep. 30, 2021

(65) Prior Publication Data
US 2023/0037943 A1    Feb. 9, 2023

(30) Foreign Application Priority Data
Mar. 23, 2020   (GB) .................................... 2004181

(51) Int. Cl.
*A61M 1/00*    (2006.01)

(52) U.S. Cl.
CPC ............ *A61M 1/918* (2021.05); *A61M 1/743* (2021.05); *A61M 1/98* (2021.05); *A61M 2205/15* (2013.01);
(Continued)

(58) Field of Classification Search
CPC ........ A61M 1/918; A61M 1/743; A61M 1/98; A61M 2205/15; A61M 2205/3331;
(Continued)

(56) References Cited

U.S. PATENT DOCUMENTS

| | | |
|---|---|---|
| 8,157,792 B2 | 4/2012 | Dolliver et al. |
| 8,308,714 B2 | 11/2012 | Weston et al. |

(Continued)

FOREIGN PATENT DOCUMENTS

| | | |
|---|---|---|
| EP | 4126094 A1 | 2/2023 |
| WO | WO-2008100440 A1 | 8/2008 |

(Continued)

OTHER PUBLICATIONS

International Search Report and Written Opinion for Application No. PCT/EP2021/057425, mailed on Jun. 18, 2021, 19 pages.
(Continued)

*Primary Examiner* — Philip R Wiest
*Assistant Examiner* — Brandon W. Levy
(74) *Attorney, Agent, or Firm* — Knobbe, Martens, Olson & Bear, LLP

(57) ABSTRACT

A negative pressure wound therapy device can include a negative pressure source configured to be connected, via a fluid flow path, to a wound, a valve positioned in the fluid flow path and configured to, in an open state, permit supply of negative pressure from the negative pressure source upstream of the valve and, in a closed state, block supply of negative pressure from the negative pressure source upstream of the valve, a flow restrictor positioned in the fluid flow path, and a pressure sensor configured to measure a pressure differential across the flow restrictor. The device can include control circuitry configured to, in a normal
(Continued)

operational mode, cause the valve to be in the open state and, in a test mode, perform at least one of a leak test, a flow test, or an excessive pressure test.

20 Claims, 11 Drawing Sheets

(52) U.S. Cl.
CPC . *A61M 2205/3331* (2013.01); *A61M 2205/70* (2013.01)

(58) Field of Classification Search
CPC ...... A61M 2205/70; A61M 1/73; A61M 1/90; A61M 2205/3334; A61M 1/96; A61M 1/982; A61M 1/74; A61M 2205/18; A61M 2205/50; A61M 2205/8206; A61M 1/966; A61M 1/984; A61M 1/71; A61M 2205/42
See application file for complete search history.

(56) References Cited

U.S. PATENT DOCUMENTS

| | | |
|---|---|---|
| 8,617,129 B2 | 12/2013 | Hartwell |
| 8,858,517 B2 | 10/2014 | Pan et al. |
| 9,408,954 B2 | 8/2016 | Gordon et al. |
| 11,376,357 B2 | 7/2022 | Aarestad |
| 11,478,383 B2 | 10/2022 | Severns et al. |
| 11,614,170 B2 | 3/2023 | Tumey et al. |
| 12,042,596 B2 | 7/2024 | Roux et al. |
| 2004/0006319 A1* | 1/2004 | Lina ..................... A61M 1/962 604/304 |
| 2007/0129707 A1* | 6/2007 | Blott ..................... A61F 13/05 604/308 |
| 2008/0077091 A1 | 3/2008 | Mulligan |
| 2014/0135719 A1* | 5/2014 | Jaeb ..................... A61M 1/784 604/319 |
| 2016/0339156 A1* | 11/2016 | Gordon ................ A61M 1/784 |
| 2018/0177929 A1 | 6/2018 | Adams et al. |
| 2019/0328943 A1 | 10/2019 | Deutsch et al. |
| 2020/0069850 A1 | 3/2020 | Beadle et al. |
| 2022/0001100 A1 | 1/2022 | Pratt et al. |

FOREIGN PATENT DOCUMENTS

| | | | |
|---|---|---|---|
| WO | WO-2015023515 A1 | 2/2015 | |
| WO | WO-2017044138 A1 | 3/2017 | |
| WO | WO-2017197357 A1 | 11/2017 | |
| WO | WO-2018150268 A1 * | 8/2018 | ............. A61M 1/64 |
| WO | WO-2018162613 A1 | 9/2018 | |
| WO | WO-2019190753 A1 | 10/2019 | |
| WO | WO-2020018328 A1 | 1/2020 | |
| WO | WO-2020061334 A1 | 3/2020 | |
| WO | WO-2020176331 A1 | 9/2020 | |
| WO | WO-2020263508 A1 | 12/2020 | |
| WO | WO-2021028773 A1 | 2/2021 | |
| WO | WO-2021059209 A1 | 4/2021 | |
| WO | WO-2021112748 A1 | 6/2021 | |

OTHER PUBLICATIONS

International Preliminary Report on Patentability for Application No. PCT/EP2021/057425, mailed on Oct. 6, 2022, 12 pages.

* cited by examiner

SELF-TESTING FOR NEGATIVE PRESSURE WOUND THERAPY DEVICES

CROSS-REFERENCE TO RELATED APPLICATIONS

This application is a U.S. national stage application of Internal Patent Application No. PCT/EP2021/057425 filed Mar. 23, 2021, which claims priority to U.K. Provisional Application No. 2004181.0, filed Mar. 23, 2020.

TECHNICAL FIELD

Embodiments described herein relate to apparatuses, systems, and methods for the treatment of wounds, for example using dressings in combination with negative pressure wound therapy.

DESCRIPTION OF THE RELATED ART

Many different types of wound dressings are known for aiding in the healing process of a human or animal. These different types of wound dressings include many different types of materials and layers, for example, gauze, pads, foam pads or multi-layer wound dressings. Topical negative pressure (TNP) therapy, sometimes referred to as vacuum assisted closure, negative pressure wound therapy, or reduced pressure wound therapy, is widely recognized as a beneficial mechanism for improving the healing rate of a wound. Such therapy is applicable to a broad range of wounds such as incisional wounds, open wounds, and abdominal wounds or the like. TNP therapy assists in the closure and healing of wounds by reducing tissue edema, encouraging blood flow, stimulating the formation of granulation tissue, removing excess exudates and may reduce bacterial load. Thus, reducing infection to the wound. Furthermore, TNP therapy permits less outside disturbance of the wound and promotes more rapid healing.

SUMMARY

A negative pressure wound therapy device can include a negative pressure source configured to be connected, via a fluid flow path, to a wound covered by a wound dressing and provide negative pressure to a wound. The device can include a valve positioned in the fluid flow path. The valve can be configured to, in an open state, permit supply of negative pressure from the negative pressure source upstream of the valve. The valve can be configured to, in a closed state, block supply of negative pressure from the negative pressure source upstream of the valve. The device can include a flow restrictor positioned in the fluid flow path, which can be positioned downstream of the valve. The device can include a pressure sensor configured to measure pressure in the fluid flow path and a pressure differential across the flow restrictor. The device can include control circuitry configured to, in a normal operational mode in which negative pressure is provided to the wound, cause the valve to be in the open state. The control circuitry can be configured to, in a test mode in which performance of the device is being verified, perform at least one of a leak test, a flow test, or an excessive pressure test. The leak test can include the control circuitry being configured to cause the valve to be closed, cause the negative pressure source to operate at a first intensity level, cause the negative pressure source to pause operation for a duration of time, and indicate presence of a leak in the fluid flow path in response to determining that a change in the negative pressure measured by the pressure sensor subsequent to expiration of the duration of time satisfies a threshold indicative of a leak. The flow test can include the control circuitry being configured to cause the valve to be opened, cause the negative pressure source to operate at a second intensity level, and indicate insufficient flow in response to determining that a pressure differential across the flow restrictor measured by the pressure sensor satisfies a pressure differential threshold indicative of insufficient flow. The excessive pressure test can include the control circuitry being configured to cause the valve to be closed, cause the negative pressure source operate at a third intensity level, and indicate fault in a system configured to protect against unsafe negative pressure in the fluid flow path in response to determining that pressure in the fluid flow path satisfies a threshold indicative of unsafe negative pressure and the system configured to protect against unsafe negative pressure has not been activated.

The negative pressure wound therapy device of any of the preceding paragraphs and/or any of the devices, apparatuses, or systems disclosed herein can include one or more of the following features. The second intensity level can be greater than the first intensity level. The first intensity level can be equal to the third intensity level. The valve can be a solenoid valve. The pressure sensor can include a first pressure sensor positioned upstream of the flow restrictor and a second pressure sensor positioned downstream of the flow restrictor. The device can include a canister configured to be positioned in the fluid flow path and collect fluid aspirated from the wound. The control circuitry can be configured to, in the test mode, verify that the canister has been removed from the fluid flow path. The control circuitry can be configured to, in the test mode, not perform the leak test, the flow test, and the excessive pressure test in response to a determination that the canister has not been removed and that the wound dressing has not been disconnected. Control can be configured to, in the test mode, provide an indication of at least one of that the canister has not been removed or that the wound dressing has not been disconnected.

The negative pressure wound therapy device of any of the preceding paragraphs and/or any of the devices, apparatuses, or systems disclosed herein can include one or more of the following features. The system configured to protect against unsafe negative pressure in the fluid flow path can include at least one of another valve positioned in the fluid flow path, the control circuitry configured to cause the another valve to open responsive to the pressure in the fluid flow path satisfying the threshold indicative of unsafe negative pressure or the control circuitry being configured to deactivate the negative pressure source responsive to the pressure in the fluid flow path satisfying the threshold indicative of unsafe negative pressure. The excessive pressure test can include the control circuitry being configured to indicate fault in the system configured to protect against unsafe negative pressure in the fluid flow path in response to determining the system configured to protect against unsafe negative pressure has been activated when pressure in the fluid flow path does not satisfy the threshold indicative of unsafe negative pressure. The device can include a check valve positioned in the fluid flow path. The check valve can be configured to permit fluid flow downstream toward the negative pressure source or an exhaust and prevent fluid flow in the opposite direction.

The negative pressure wound therapy device of any of the preceding paragraphs and/or any of the devices, apparatuses, or systems disclosed herein can include one or more of the following features. The control circuitry can be configured to perform, in the test mode, a health test including determining efficiency of the negative pressure source and indicating sufficient health in response to determining that the efficiency satisfies an efficiency threshold. The control circuitry can be configured to determine the efficiency of the negative pressure source by determining a ratio of an amount of power output by the negative pressure source to an amount of power provided to the negative pressure source. The control circuitry can be configured to determine the amount of power output by the negative pressure source based on determining a product of a mass flow rate and a specific work of the negative pressure source. The control circuitry can be configured to determine at least one of the mass flow rate or the specific work based on determining the pressure differential across the flow restrictor. The control circuitry can be configured to determine the mass flow rate based on determining a volumetric flow rate. The control circuitry can be configured to perform the health test following a successful completion of the flow test. The valve can operate as the flow restrictor.

A negative pressure wound therapy device can include a negative pressure source configured to be connected, via a fluid flow path, to a wound covered by a wound dressing and provide negative pressure to a wound. The device can include a valve positioned in the fluid flow path. The valve can be configured to, in an open state, permit supply of negative pressure from the negative pressure source upstream of the valve. The valve can be configured to, in a closed state, block supply of negative pressure from the negative pressure source upstream of the valve. The device can include a flow restrictor positioned in the fluid flow path. The device can include a pressure sensor configured to measure pressure in the fluid flow path. The device can include control circuitry configured to, in a normal operational mode in which negative pressure is provided to the wound, cause the valve to be in the open state. The control circuitry can be configured to, in a test mode in which performance of the device is being verified, perform at least one of a leak test or a flow test. The leak test can include the control circuitry being configured to cause the valve to be closed, cause the negative pressure source to operate at a first intensity level, cause the negative pressure source to pause operation for a duration of time, and indicate presence of a leak in the fluid flow path in response to determining that a change in the negative pressure measured by the pressure sensor subsequent to expiration of the duration of time satisfies a threshold indicative of a leak. The flow test can include the control circuitry being configured to: cause the valve to be opened, cause the negative pressure source to operate at a second intensity level, and indicate insufficient flow in response to determining that a pressure difference across the flow restrictor measured by the pressure sensor satisfies a pressure difference threshold indicative of insufficient flow.

The negative pressure wound therapy device of any of the preceding paragraphs and/or any of the devices, apparatuses, or systems disclosed herein can include one or more of the following features. The control circuitry can be configured to, in the test mode, perform at least one of the leak test, the flow test, or an excessive pressure test. The excessive pressure test can include the control circuitry being configured to cause the valve to be closed, cause the negative pressure source operate at a third intensity level, and indicate fault in excessive pressure protection in response to determining that pressure in the fluid flow path satisfies a threshold indicative of unsafe negative pressure and the excessive pressure protection has not been activated. The excessive pressure protection can include at least one of another valve positioned in the fluid flow path, the control circuitry configured to cause the another valve to open responsive to the pressure in the fluid flow path satisfying the threshold indicative of unsafe negative pressure (to vent excessive pressure into the surrounding environment) or the control circuitry being configured to deactivate the negative pressure source responsive to the pressure in the fluid flow path satisfying the threshold indicative of unsafe negative pressure. The excessive pressure test can include the control circuitry being configured to indicate fault in the excessive pressure protection in response to determining the excessive pressure protection has been activated when pressure in the fluid flow path does not satisfy the threshold indicative of unsafe negative pressure.

The negative pressure wound therapy device of any of the preceding paragraphs and/or any of the devices, apparatuses, or systems disclosed herein can include one or more of the following features. The second intensity level can be greater than the first intensity level. The valve can be a solenoid valve. The pressure sensor can include a first pressure sensor positioned upstream of the flow restrictor and a second pressure sensor positioned downstream of the flow restrictor. The device can include a canister configured to be positioned in the fluid flow path and collect fluid aspirated from the wound. The control circuitry can be configured to, in the test mode, verify that the canister has been removed from the fluid flow path. The control circuitry can be configured to, in the test mode, not perform the leak test and the flow test in response to a determination that the canister has not been removed and that the wound dressing has not been disconnected. The control circuitry can be configured to, in the test mode, provide an indication of at least one of that the canister has not been removed or that the wound dressing has not been disconnected. The device can include a check valve positioned in the fluid flow path. The check valve can be configured to permit fluid flow downstream toward the negative pressure source or an exhaust and prevent fluid flow in the opposite direction.

The negative pressure wound therapy device of any of the preceding paragraphs and/or any of the devices, apparatuses, or systems disclosed herein can include one or more of the following features. The control circuitry can be configured to perform, in the test mode, a health test comprising determining efficiency of the negative pressure source and indicating sufficient health in response to determining that the efficiency satisfies an efficiency threshold. The control circuitry can be configured to determine the efficiency of the negative pressure source by determining a ratio of an amount of power output by the negative pressure source to an amount of power provided to the negative pressure source. The control circuitry can be configured to determine the amount of power output by the negative pressure source based on determining a product of a mass flow rate and a specific work of the negative pressure source. The control circuitry can be configured to determine at least one of the mass flow rate or the specific work based on determining the pressure difference across the flow restrictor. The control circuitry is configured to determine the mass flow rate based on determining a volumetric flow rate. The control circuitry can be configured to perform the health test following a successful completion of the flow test. The valve can operate as the flow restrictor.

Disclosed are methods of operating a negative pressure wound therapy device of any of the preceding paragraphs and/or any of the devices, apparatuses, or systems disclosed herein. Discloses are kits that include the negative pressure wound therapy device of any of the preceding paragraphs and/or any of the devices, apparatuses, or systems disclosed herein and one or more wound dressings or canisters.

Any of the features, components, or details of any of the arrangements or embodiments disclosed in this application, including without limitation any of the apparatus embodiments and any of the negative pressure wound therapy embodiments disclosed herein, are interchangeably combinable with any other features, components, or details of any of the arrangements or embodiments disclosed herein to form new arrangements and embodiments.

DETAILED DESCRIPTION

Figure 1A:
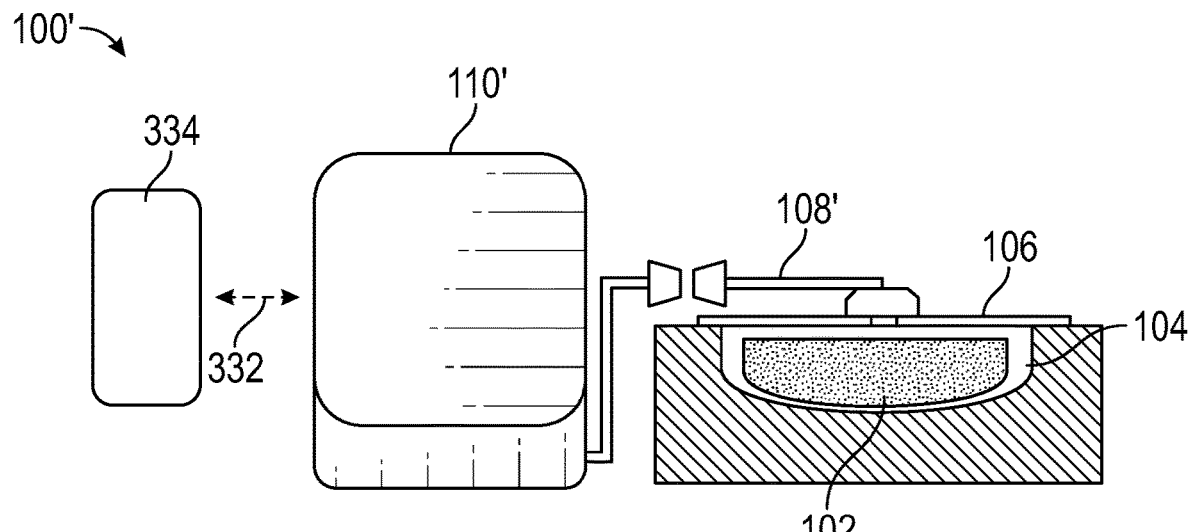
FIG. 1A illustrates a negative pressure wound therapy system.

Embodiments disclosed herein relate to systems and methods of treating and/or monitoring a wound. Some embodiments of the negative pressure wound therapy devices disclosed herein can include a negative pressure source configured to be connected and/or fluidically coupled, via a fluid flow path, to a wound covered by a wound dressing and provide negative pressure to a wound.

Throughout this specification reference is made to a wound. The term wound is to be broadly construed and encompasses open and closed wounds in which skin is torn, cut or punctured or where trauma causes a contusion, or any other superficial or other conditions or imperfections on the skin of a patient or otherwise that benefit from pressure treatment. A wound is thus broadly defined as any damaged region of tissue where fluid may or may not be produced. Examples of such wounds include, but are not limited to, abdominal wounds or other large or incisional wounds, either as a result of surgery, trauma, sterniotomies, fasciotomies, or other conditions, dehisced wounds, acute wounds, chronic wounds, subacute and dehisced wounds, traumatic wounds, flaps and skin grafts, lacerations, abrasions, contusions, burns, diabetic ulcers, pressure ulcers, stoma, surgical wounds, trauma and venous ulcers or the like.

Embodiments of systems and methods disclosed herein can be used with topical negative pressure ("TNP") or reduced pressure therapy systems. Briefly, negative pressure wound therapy assists in the closure and healing of many forms of "hard to heal" wounds by reducing tissue oedema, encouraging blood flow and granular tissue formation, or removing excess exudate and can reduce bacterial load (and thus infection risk). In addition, the therapy allows for less disturbance of a wound leading to more rapid healing. TNP therapy systems can also assist in the healing of surgically closed wounds by removing fluid. TNP therapy can help to stabilize the tissue in the apposed position of closure. A further beneficial use of TNP therapy can be found in grafts and flaps where removal of excess fluid is important and close proximity of the graft to tissue is required in order to ensure tissue viability.

As used herein, reduced or negative pressure levels, such as −X mmHg, represent pressure levels relative to normal ambient atmospheric pressure, which can correspond to 760 mmHg (or 1 atm, 29.93 inHg, 101.325 kPa, 14.696 psi, etc.). Accordingly, a negative pressure value of −X mmHg reflects pressure that is X mmHg below 760 mmHg or, in other words, a pressure of (760−X) mmHg. In addition, negative pressure that is "less" or "smaller" than X mmHg corresponds to pressure that is closer to atmospheric pressure (for example, −40 mmHg is less than −60 mmHg). Negative pressure that is "more" or "greater" than −X mmHg corresponds to pressure that is further from atmospheric pressure (for example, −80 mmHg is more than −60 mmHg). In some cases, local ambient atmospheric pressure is used as a reference point, and such local atmospheric pressure may not necessarily be, for example, 760 mmHg.

Systems and methods disclosed herein can be used with other types of treatment in addition to or instead of reduced pressure therapy, such as irrigation, ultrasound, heat or cold, neuro stimulation, or the like. In some cases, disclosed systems and methods can be used for wound monitoring without application of additional therapy. Systems and methods disclosed herein can be used in conjunction with a dressing, including with compression dressing, reduced pressure dressing, or the like.

A healthcare provider, such as a clinician, nurse, or the like, can provide a TNP prescription specifying, for example, the pressure level or time of application. However, the healing process is different for each patient and the prescription may affect the healing process in a way the clinician or healthcare provider did not expect at the time of devising the prescription. A healthcare provider may try to adjust the prescription as the wound heals (or does not heal), but such process may require various appointments that can be time consuming and repetitive. Embodiments disclosed herein provide systems, devices, or methods of efficiently adjusting TNP prescriptions and delivering effective TNP therapy.

Wound Therapy System

FIG. 1A schematically illustrates a negative pressure wound treatment system 100 (sometimes referred to as a reduced or negative pressure wound therapy system, a TNP system, or a wound treatment system). In any implementations disclosed herein, though not required, the negative pressure wound treatment system 100 can include a wound filler 102 placed on or inside a wound 104 (which may be a cavity). The wound 104 can be sealed by a wound cover 106, which can be a drape, such that the wound cover 106 can be in fluidic communication with the wound 104. The wound filler 102 in combination with the wound cover 106 can be referred to as a wound dressing. A tube or conduit 108 (also referred to herein as a flexible suction adapter or a fluidic connector) can be used to connect the wound cover 106 with a wound therapy device 110 (sometimes as a whole or partially referred to as a "pump assembly") configured to supply reduced or negative pressure. The conduit 108 can be a single or multi lumen tube. A connector 112 can be used to removably and selectively couple a conduit or tube 142 with the conduit 108.

In any of the systems disclosed herein, a wound therapy device can be canisterless, wherein, for example and without limitation, wound exudate is collected in the wound dressing or is transferred via a conduit for collection at another location. However, any of the wound therapy devices disclosed herein can include or support a canister.

Additionally, with any of the wound therapy systems disclosed herein, any of the wound therapy devices can be mounted to or supported by the wound dressing or adjacent to the wound dressing. The wound filler 102 can be any suitable type, such as hydrophilic or hydrophobic foam, gauze, inflatable bag, and so on. The wound filler 102 can be conformable to the wound 104 such that the wound filler 102 substantially fills the cavity of the wound 104. The wound cover 106 can provide a substantially fluid impermeable seal over the wound 104. The wound cover 106 can have a top side and a bottom side. The bottom side can adhesively (or in any other suitable manner) seal with the wound 104, for example by sealing with the skin around the wound 104. The conduit 108 or any other conduit disclosed herein can be formed from polyurethane, PVC, nylon, polyethylene, silicone, or any other suitable material.

The wound cover 106 can have a port (not shown) configured to receive an end of the conduit 108. In some cases, the conduit 108 can otherwise pass through or under the wound cover 106 to supply reduced pressure to the wound 104 so as to maintain a desired level of reduced pressure in the wound 104. The conduit 108 can be any suitable article configured to provide at least a substantially sealed fluid flow pathway or path between the wound therapy device 110 and the wound cover 106, so as to supply the reduced pressure provided by the wound therapy device 110 to wound 104.

The wound cover 106 and the wound filler 102 can be provided as a single article or an integrated single unit. In some cases, no wound filler is provided and the wound cover by itself may be considered the wound dressing. The wound dressing can then be connected, via the conduit 108, to a source of negative pressure of the wound therapy device 110. In some cases, though not required, the wound therapy device 110 can be miniaturized and portable, although larger conventional negative pressure sources (or pumps) can also be used.

The wound cover 106 can be located over a wound site to be treated. The wound cover 106 can form a substantially sealed cavity or enclosure over the wound. The wound cover 106 can have a film having a high water vapour permeability to enable the evaporation of surplus fluid, and can have a superabsorbing material contained therein to safely absorb wound exudate. In some cases, the components of the TNP systems described herein can be particularly suited for incisional wounds that exude a small amount of wound exudate.

The wound therapy device 110 can operate with or without the use of an exudate canister. In some cases, as is illustrated, the wound therapy device 110 can include an exudate canister. In some cases, configuring the wound therapy device 110 and conduit 108 so that the conduit 108 can be quickly and easily removed from the wound therapy device 110 can facilitate or improve the process of wound dressing or pump changes, if necessary. Any of the pump assemblies disclosed herein can have any suitable connection between the conduit 108 and the pump.

The wound therapy device 110 can deliver negative pressure of approximately −80 mmHg, or between about −20 mmHg and −200 mmHg. Note that these pressures are relative to normal ambient atmospheric pressure thus, −200 mmHg would be about 560 mmHg in practical terms. In some cases, the pressure range can be between about −40 mmHg and −150 mmHg. Alternatively, a pressure range of up to −75 mmHg, up to −80 mmHg or over −80 mmHg can be used. Also in some cases a pressure range of below −75 mmHg can be used. Alternatively, a pressure range of over approximately −100 mmHg, or even −150 mmHg, can be supplied by the wound therapy device 110.

As will be described in greater detail below, the negative pressure wound treatment system 100 can be configured to provide a connection 332 to a separate or remote computing device 334. The connection 332 can be wired or wireless (such as, Bluetooth, NFC, WiFi, or cellular). The remote computing device 334 can be a smartphone, a tablet, a laptop or another standalone computer, a server (such as, a cloud server), another pump device, or the like.

Figure 1B:
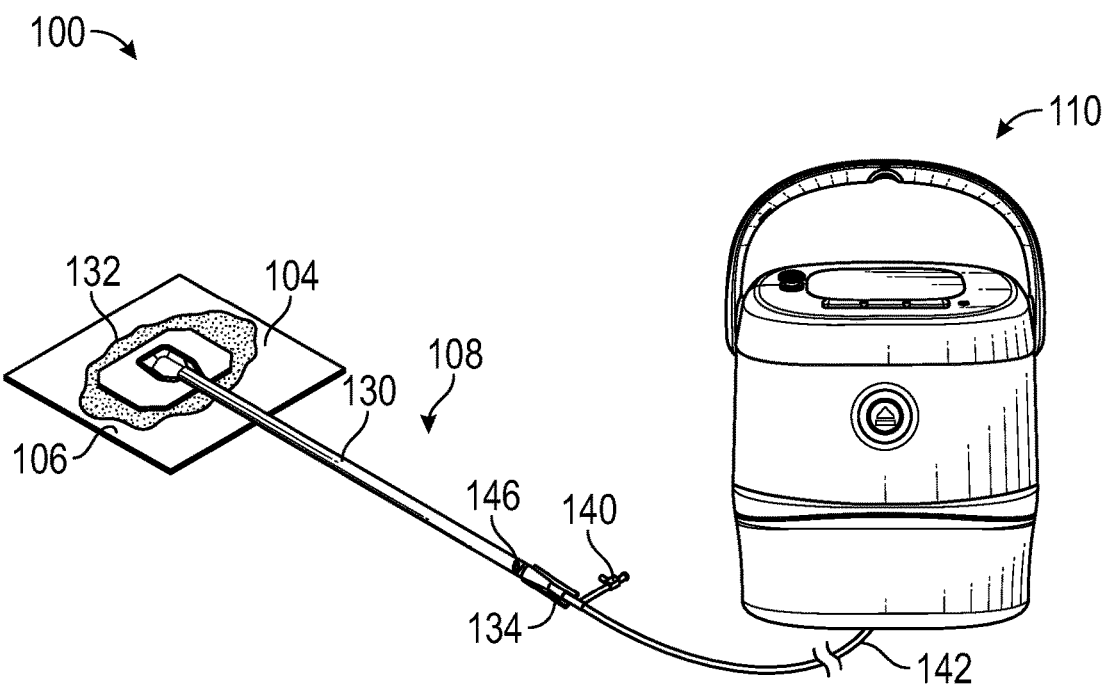
FIG. 1B illustrates another negative pressure wound therapy system.

FIG. 1B illustrates another negative pressure wound treatment system 100'. The negative pressure wound treatment system 100' can have any of the components, features, or other details of any of the other negative pressure wound treatment system disclosed herein, including without limitation the negative pressure wound treatment system 100 illustrated in FIG. 1A or the negative pressure wound treatment system 400 illustrated in FIG. 4, in combination with or in place of any of the components, features, or other details of the negative pressure wound treatment system 100' shown in FIG. 1B and/or described herein. The negative pressure wound treatment system 100' can have a wound cover 106 over a wound 104 that can seal the wound 104. A conduit 108', such as a single or multi lumen tube can be used to connect the wound cover 106 with a wound therapy device 110' (sometimes as a whole or partially referred to as a "pump assembly") configured to supply reduced or negative pressure. The wound cover 106 can be in fluidic communication with the wound 104.

With reference to FIG. 1B, the conduit 108' can have a bridge portion 130 that can have a proximal end portion and a distal end portion (the distal end portion being closer to the wound 104 than the proximal end portion, and an applicator 132 at the distal end of the bridge portion 130 forming the flexible suction adapter (or conduit) 108'. A connector 134 can be disposed at the proximal end of the bridge portion 130, so as to connect to at least one of the channels that can extend along a length of the bridge portion 130 of the conduit 108 shown in FIG. 1B. A cap 140 can be coupled with a portion of the conduit 108 and can, in some cases, as illustrated, be attached to the connector 134. The cap 140 can be useful in preventing fluids from leaking out of the proximal end of the bridge portion 130. The conduit 108' can be a Soft Port manufactured by Smith & Nephew. As mentioned, the negative pressure wound treatment system 100' can include a source of negative pressure, such as the device 110', capable of supplying negative pressure to the wound 104 through the conduit 108'. Though not required, the device 110' can also include a canister or other container for the storage of wound exudates and other fluids that can be removed from the wound.

The device 110' can be connected to the connector 134 via a conduit or tube 142. In use, the applicator 132 can be placed over an aperture formed in a cover 106 that is placed over a suitably-prepared wound or wound 104. Subsequently, with the wound therapy device 110' connected via the tube 142 to the connector 134, the wound therapy device 110' can be activated to supply negative pressure to the wound. Application of negative pressure can be applied until a desired level of healing of the wound is achieved.

The bridge portion 130 can comprise an upper channel material or layer positioned between an upper layer and an intermediate layer, with a lower channel material or layer positioned between the intermediate layer and a bottom layer. The upper, intermediate, and lower layers can have elongate portions extending between proximal and distal ends and can include a material that is fluid-impermeable, for example polymers such as polyurethane. It will of course be appreciated that the upper, intermediate, and lower layers can each be constructed from different materials, including semi-permeable materials. In some cases, one or more of the upper, intermediate, and lower layers can be at least partially transparent. In some instances, the upper and lower layers can be curved, rounded or outwardly convex over a majority of their lengths.

The upper and lower channel layers can be elongate layers extending from the proximal end to the distal end of the bridge 130 and can each preferably comprise a porous material, including for example open-celled foams such as polyethylene or polyurethane. In some cases, one or more of the upper and lower channel layers can be comprised of a fabric, for example a knitted or woven spacer fabric (such as a knitted polyester 3D fabric, Baltex 7970®, or Gehring 879®) or a nonwoven material, or terry-woven or loop-pile materials. The fibers may not necessarily be woven, and can include felted and flocked (including materials such as Flotex®) fibrous materials. The materials selected are preferably suited to channeling wound exudate away from the wound and for transmitting negative pressure or vented air to the wound site, and can also confer a degree of kinking or occlusion resistance to the channel layers. In one example, the upper channel layer can include an open-celled foam such as polyurethane, and the lower channel layer can include a fabric. In another example, the upper channel layer is optional, and the system can instead be provided with an open upper channel. The upper channel layer can have a curved, rounded or upwardly convex upper surface and a substantially flat lower surface, and the lower channel layer can have a curved, rounded or downwardly convex lower surface and a substantially flat upper surface.

The fabric or material of any components of the bridge 130 can have a three-dimensional (3D) structure, where one or more types of fibers form a structure where the fibers extend in all three dimensions. Such a fabric can in some cases aid in wicking, transporting fluid or transmitting negative pressure. In some cases, the fabric or materials of the channels can include several layers of material stacked or layered over each other, which can in some cases be useful in preventing the channel from collapsing under the application of negative pressure. The materials used in some implementations of the conduit 108' can be conformable and pliable, which can, in some cases, help to avoid pressure ulcers and other complications which can result from a wound treatment system being pressed against the skin of a patient.

The distal ends of the upper, intermediate, and lower layers and the channel layers can be enlarged at their distal ends (to be placed over a wound site), and can form a "teardrop" or other enlarged shape. The distal ends of at least the upper, intermediate, and lower layers and the channel layers can also be provided with at least one through aperture. This aperture can be useful not only for the drainage of wound exudate and for applying negative pressure to the wound, but also during manufacturing of the device, as these apertures can be used to align these respective layers appropriately.

In some implementations, a controlled gas leak 146 (sometimes referred to as gas leak, air leak, or controlled air leak) can be disposed on the bridge portion 130, for example at the proximal end thereof. This air leak 146 can comprise an opening or channel extending through the upper layer of the bridge portion 130, such that the air leak 146 is in fluidic communication with the upper channel of the bridge portion 130. Upon the application of suction to the conduit 108, gas (such, as air) can enter through the gas leak 146 and move from the proximal end of the bridge portion 130 to the distal end of the bridge portion along the upper channel of the bridge portion 130. The gas can then be suctioned into the lower channel of the bridge portion 130 by passing through the apertures through the distal ends of the upper, intermediate, and lower layers.

The air leak 146 can include a filter. Preferably, the air leak 146 is located at the proximal end of the bridge portion 130 so as to minimize the likelihood of wound exudate or other fluids coming into contact and possibly occluding or interfering with the air leak 146 or the filter. In some instances, the filter can be a microporous membrane capable of excluding microorganisms and bacteria, and which may be able to filter out particles larger than 45 µm. Preferably, the filter can exclude particles larger than 1.0 m, and more preferably, particles larger than 0.2 m. Advantageously, some implementations can provide for a filter that is at least partially chemically-resistant, for example to water, common household liquids such as shampoos, and other surfactants. In some cases, reapplication of vacuum to the suction adapter or wiping of the exposed outer portion of the filter may be sufficient to clear any foreign substance occluding the filter. The filter can be composed of a suitably-resistant polymer such as acrylic, polyethersulfone, or polytetrafluoroethylene, and can be oleophobic or hydrophobic. In some cases, the gas leak 146 can supply a relatively constant gas flow that does not appreciably increase as additional negative pressure is applied to the conduit 108'. In instances of the negative pressure wound treatment system 100 where the gas flow through the gas leak 146 increases as additional negative pressure is applied, preferably this increased gas flow will be minimized and not increase in proportion to the negative pressure applied thereto. Further description of such bridges, conduits, air leaks, and other components, features, and details that can be used with any implementations of the negative pressure wound treatment systems disclosed herein are found in U.S. Pat. No. 8,801,685, which is incorporated by reference in its entirety as if fully set forth herein.

Any of the wound therapy devices (such as, the device 110 or 110') disclosed herein can provide continuous or intermittent negative pressure therapy. Continuous therapy can be delivered at above 0 mmHg, −25 mmHg, −40 mmHg, −50 mmHg, −60 mmHg, −70 mmHg, −80 mmHg, −90 mmHg, −100 mmHg, −120 mmHg, −140 mmHg, −160 mmHg, −180 mmHg, −200 mmHg, or below −200 mmHg. Intermittent therapy can be delivered between low and high negative pressure set points (sometimes referred to as setpoint). Low set point can be set at above 0 mmHg, −25 mmHg, −40 mmHg, −50 mmHg, −60 mmHg, −70 mmHg, −80 mmHg, −90 mmHg, −100 mmHg, −120 mmHg, −140 mmHg, −160 mmHg, −180 mmHg, or below −180 mmHg.

High set point can be set at above −25 mmHg, −40 mmHg, −50 mmHg, −60 mmHg, −70 mmHg, −80 mmHg, −90 mmHg, −100 mmHg, −120 mmHg, −125 mmHg, −140 mmHg, −160 mmHg, −180 mmHg, −200 mmHg, or below −200 mmHg. During intermittent therapy, negative pressure at low set point can be delivered for a first time duration, and upon expiration of the first time duration, negative pressure at high set point can be delivered for a second time duration. Upon expiration of the second time duration, negative pressure at low set point can be delivered. The first and second time durations can be same or different values.

In operation, the wound filler 102 can be inserted into the cavity of the wound 104, and wound cover 106 can be placed so as to seal the wound 104. The wound therapy device 110' can provide negative pressure to the wound cover 106, which can be transmitted to the wound 104 via the wound filler 102. Fluid (such as, wound exudate) can be drawn through the conduit 108' and stored in a canister. In some cases, fluid is absorbed by the wound filler 102 or one or more absorbent layers (not shown).

Wound dressings that can be utilized with the pump assembly and systems of the present application include Renasys-F, Renasys-G, Renasys AB, and Pico Dressings available from Smith & Nephew. Further description of such wound dressings and other components of a negative pressure wound therapy system that can be used with the pump assembly and systems of the present application are found in U.S. Patent Publication Nos. 2012/0116334, 2011/0213287, 2011/0282309, 2012/0136325, U.S. Pat. No. 9,084,845, and International App. No. PCT/EP2020/078376, each of which is incorporated by reference in its entirety as if fully set forth herein. In some cases, other suitable wound dressings can be utilized.

Figure 2A:
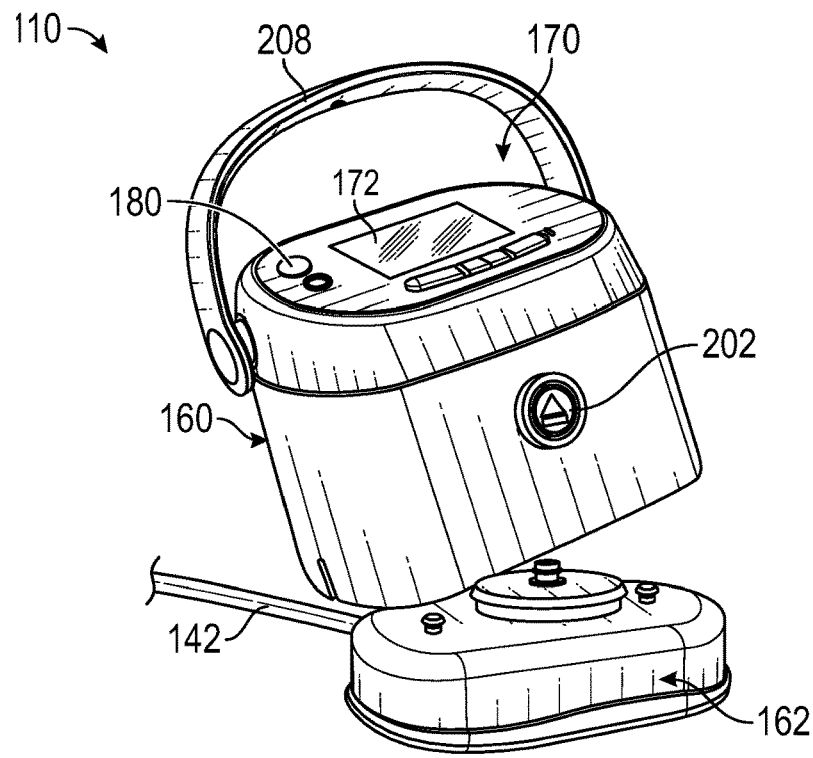
FIG. 2A is an isometric view of a negative pressure wound therapy device and canister, showing the canister detached from the pump assembly of the device.
Figure 2B:
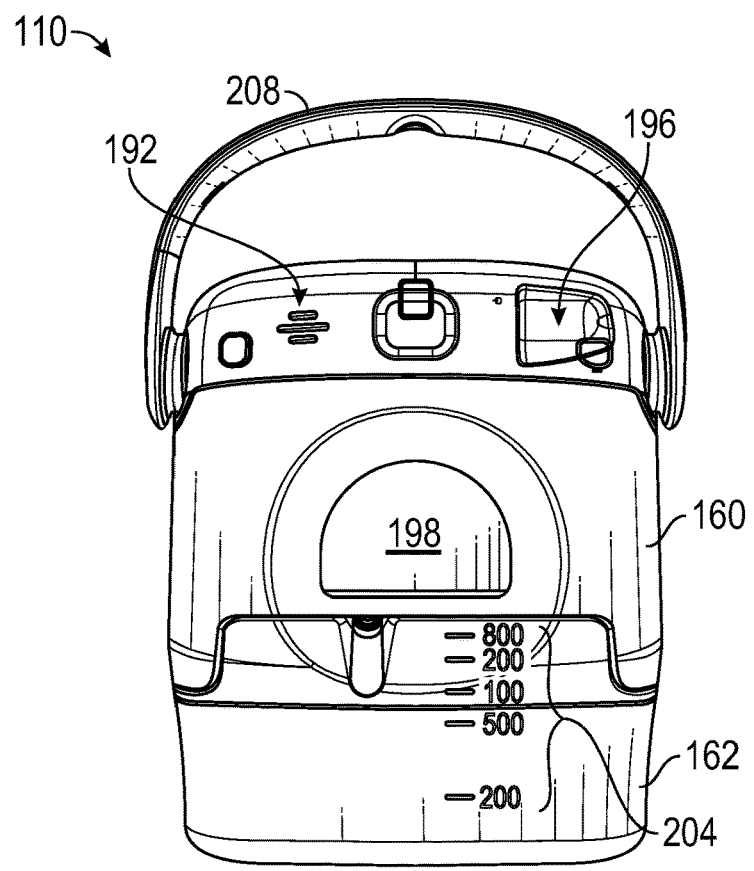
FIG. 2B is a back view of the negative pressure wound therapy device shown in FIG. 2A.
Figure 2C:
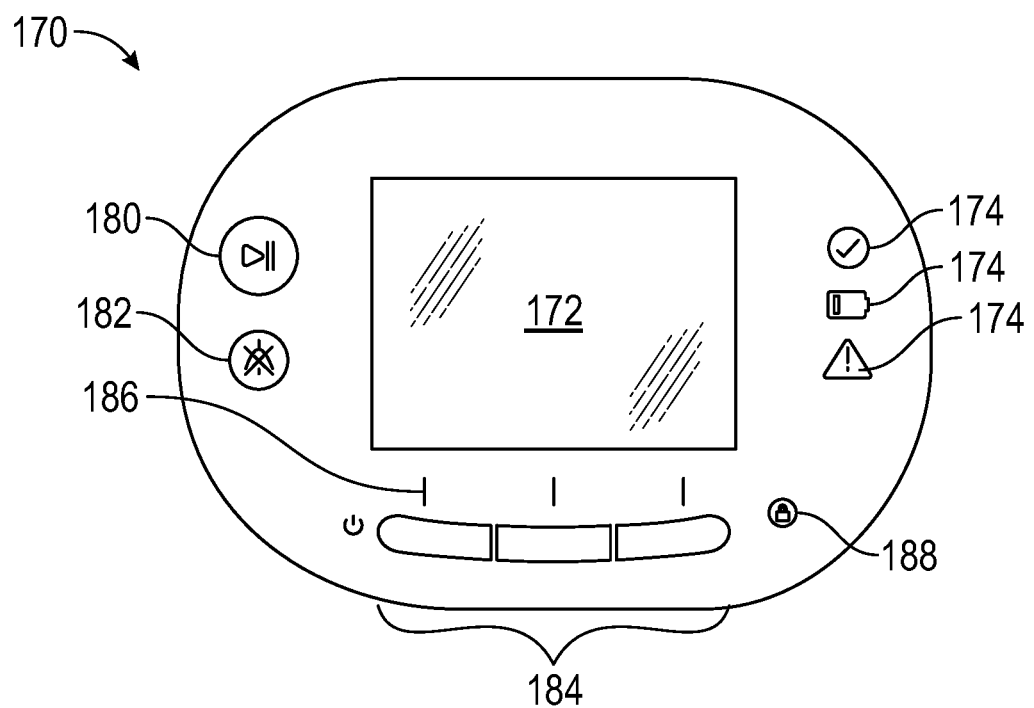
FIG. 2C illustrates a top surface of the negative pressure wound therapy device shown in FIG. 2A, showing a user interface.

FIGS. 2A-2C show the negative pressure wound therapy device 110'. As illustrated, a pump assembly 160 and canister 162 can be connected, thereby forming the wound therapy device 110'. With reference to FIG. 2C, the pump assembly 160 can include an interface panel 170 having a display 172, one or more indicators 174, or one or more controls or buttons, including, for example and without limitation, a therapy start and pause button 180 or an alarm/alert mute button 182. The interface panel 170 can have one or more input controls or buttons 184 (three being shown) that can be used to control any functions of the pump assembly 160 or the interface panel 170. For example and without limitation, one or more of the buttons 184 can be used to turn the pump assembly 160 on or off, to start or pause therapy, to operate and monitor the operation of the pump assembly 160, to scroll through menus displayed on the display 172, or to control or perform other functions. In some cases, the command buttons 184 can be programmable, and can be made from a tactile, soft rubber.

Additionally, the interface panel 170 can have visual indicators 186 that can indicate which of the one or more buttons 184 is active. The interface panel 170 can also have a lock/unlock control or button 188 that can be configured to selectively lock or unlock the functionality of the various buttons (e.g., buttons 184) or the display 172. When the lock/unlock button 188 is in the locked state, depressing one or more of the various other buttons or the display will not cause the pump assembly 160 to change any display functions or performance functions of the device. This way, the interface panel 170 will be protected from inadvertent bumping or touching of the various buttons or display. The interface panel 170 can be located on an upper portion of the pump assembly 160, for example and without limitation on an upward facing surface of the pump assembly 160.

The display 172, which can be a screen such as an LED screen, can be mounted in a middle portion of the interface panel 170. The display 172 can be a touch screen display. The display 172 can support playback of audiovisual (AV) content, such as instructional videos, and render a number of screens or graphical user interfaces (GUIs) for configuring, controlling, and monitoring the operation of the pump assembly 160.

The one or more indicators 174 can be lights (such as, LEDs) and can be configured to provide a visual indication of alarm conditions and or a status of the pump. For example and without limitation, the one or more indicators 174 can be configured to provide a visual indication of a status of the pump assembly 160 or other components of the negative pressure wound treatment system 100', including without limitation the conduit 108' or the wound cover 106 (such as, to provide an indication of normal operation, low battery, a leak, canister full, blockage, overpressure, or the like). Any one or more suitable indicators can be additionally or alternatively used, such as visual, audio, tactile indicator, and so on.

FIG. 2B shows a back or rear view of the wound therapy device 110' shown in the FIG. 2A. As shown, the pump assembly 160 can include a speaker 192 for producing sound. For example and without limitation, the speaker 192 can generate an acoustic alarm in response to deviations in therapy delivery, non-compliance with therapy delivery, or any other similar or suitable conditions or combinations thereof. The speaker 192 can provide audio to accompany one or more instructional videos that can be displayed on the display 172.

The pump assembly 160 can be configured to provide easy access (such as, an access door on the casing of the pump assembly) to one or more filters of the pump assembly 160, such as antibacterial filters. This can enable a user (such as, a healthcare provider or patient) to more easily access, inspect or replace such filters. The pump assembly 160 can also include a power jack 196 for providing power to the pump assembly 160 or for charging and recharging an internal power source (such as, a battery). Some implementations of the pump assembly 160 can include a disposable or renewable power source, such as one or more batteries, so that no power jack is needed. The pump assembly 160 can have a recess 198 formed therein to facilitate gripping of the pump assembly 160.

The canister 162 can hold fluid aspirated from the wound 104. For example, the canister 162 can have an 800 mL (or approximately 800 mL) capacity, or from a 300 mL or less capacity to a 1000 mL or more capacity, or any capacity level in this range. The canister 162 can include a tubing for connecting to the conduit 108' in order to form a fluid flow path. The canister 162 can be replaced with another canister, such as when the canister 162 has been filled with fluid. With reference to FIG. 2A, the wound therapy device 110' can include a canister inlet tube 200 (also referred to herein as a dressing port connector) in fluid communication with the canister 162. For example and without limitation, the canister inlet tube 200 can be used to connect with the conduit 108'.

The canister 162 can be selectively coupleable and removable from the pump assembly 160. With reference to FIG. 2A, in some cases, a canister release button 202 can be configured to selectively release the canister 162 from the pump assembly 160. With reference to FIG. 2B, the canister 162 can have one or more fill lines or graduations 204 to indicate to the user and amount of fluid or exudate stored within the canister 162.

The wound therapy device 110' can have a handle 208 that can be used to lift or carry the wound therapy device 110'. The handle 208 can be coupled with the pump assembly 160 and can be rotatable relative to the wound therapy device 110' so that the handle can be rotated upward for lifting or carrying the wound therapy device 110' or the pump assembly 160, or rotated into a lower profile in a more compact position when the handle is not being used. In some cases, the handle 208 can be coupled with the pump assembly 160 in a fixed position. The handle 208 can be coupled with an upper portion of the pump assembly 160 or can be removable from the wound therapy device 110'.

Figure 3:
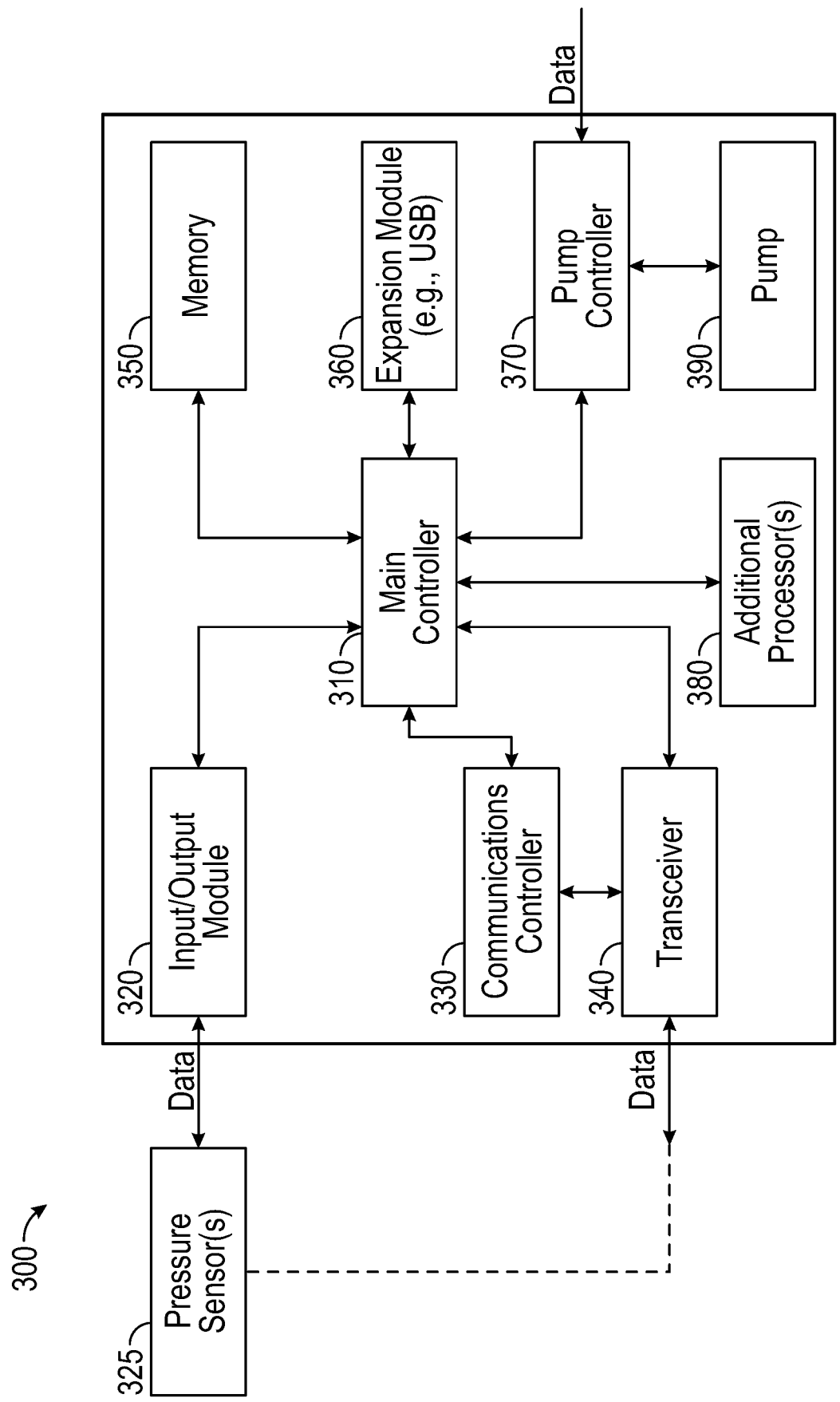
FIG. 3 illustrates a schematic of a control system of a negative pressure wound therapy device.

FIG. 3 illustrates a schematic of a control system 300 that can be employed in any of the wound therapy devices described herein, such as in the wound therapy device 110'. Electrical components can operate to accept user input, provide output to the user, operate the pressure source, provide connectivity, and so on. A first processor (such as, a main controller 310) can be responsible for user activity, and a second processor (such as, a pump controller 370) can be responsible for controlling another device, such as a pump 390.

An input/output (I/O) module 320 can be used to control an input and/or output to another component or device, such as the pump 390, one or more sensors (for example, one or more pressure sensors 325 configured to monitor pressure in one or more locations of the fluid flow path), or the like. For example, the I/O module can receive data from one or more sensors through one or more ports, such as serial (for example, I2C), parallel, hybrid ports, and the like. Any of the pressure sensors can be part of the wound therapy device or the canister. In some cases, any of the pressure sensors 325 can be remote to the wound therapy device, such as positioned at or near the wound (for example, in the dressing or the conduit connecting the dressing to the wound therapy device). In such implementations, any of the remote pressure sensors can communicate with the I/O module over a wired connection or with one or more transceivers 340 over a wireless connection.

The main controller 310 can receive data from and provide data to one or more expansion modules 360, such as one or more USB ports, SD ports, Compact Disc (CD) drives, DVD drives, FireWire ports, Thunderbolt ports, PCI Express ports, and the like. The main controller 310, along with other controllers or processors, can store data in memory 350 (such as one or more memory modules), which can be internal or external to the main controller 310. Any suitable type of memory can be used, including volatile or non-volatile memory, such as RAM, ROM, magnetic memory, solid-state memory, Magnetoresistive random-access memory (MRAM), and the like.

The main controller 310 can be a general purpose controller, such as a low-power processor or an application specific processor. The main controller 310 can be configured as a "central" processor in the electronic architecture of the control system 300, and the main controller 310 can coordinate the activity of other processors, such as the pump controller 370, communications controller 330, and one or more additional processors 380. The main controller 310 can run a suitable operating system, such as a Linux, Windows CE, VxWorks, etc.

The pump controller 370 can control the operation of a pump 390, which can generate negative or reduced pressure. The pump 390 can be a suitable pump, such as a diaphragm pump, peristaltic pump, rotary pump, rotary vane pump, scroll pump, screw pump, liquid ring pump, diaphragm pump operated by a piezoelectric transducer, voice coil pump, and the like. The pump controller 370 can measure pressure in a fluid flow path, using data received from one or more pressure sensors 325, calculate the rate of fluid flow, and control the pump. The pump controller 370 can control the pump actuator (such as, a motor) so that a desired level of negative pressure is achieved in the wound 104. The desired level of negative pressure can be pressure set or selected by the user. The pump controller 370 can control the pump (for example, pump motor) using pulse-width modulation (PWM) or pulsed control. A control signal for driving the pump can be a 0-100% duty cycle PWM signal. The pump controller 370 can perform flow rate calculations and detect alarms. The pump controller 370 can communicate information to the main controller 310. The pump controller 370 can be a low-power processor.

A communications controller 330 can provide connectivity (such as, a wired or wireless connection 332). The communications controller 330 can utilize one or more transceivers 340 for sending and receiving data. The one or more transceivers 340 can include one or more antennas, optical sensors, optical transmitters, vibration motors or transducers, vibration sensors, acoustic sensors, ultrasound sensors, or the like. The communications controller 330 can provide one or more of the following types of connections: Global Positioning System (GPS), cellular connectivity (for example, 2G, 3G, LTE, 4G, 5G, or the like), near field communication (NFC), Bluetooth connectivity, radio frequency identification (RFID), wireless local area network (WLAN), wireless personal area network (WPAN), WiFi connectivity, Internet connectivity, optical connectivity (for example, using infrared light, barcodes, such as QR codes, etc.), acoustic connectivity, ultrasound connectivity, or the like. Connectivity can be used for various activities, such as pump assembly location tracking, asset tracking, compliance monitoring, remote selection, uploading of logs, alarms, and other operational data, and adjustment of therapy settings, upgrading of software or firmware, pairing, and the like.

The communications controller 330 can provide dual GPS/cellular functionality. Cellular functionality can, for example, be 3G, 4G, or 5G functionality. The communications controller 330 can communicate information to the main controller 310. The communications controller 330 can include internal memory or can utilize memory 350. The communications controller 330 can be a low-power processor.

The control system 300 can store data, such as GPS data, therapy data, device data, and event data. This data can be stored, for example, in memory 350. This data can include patient data collected by one or more sensors. The control system 300 can track and log therapy and other operational data. Such data can be stored, for example, in the memory 350.

Using the connectivity provided by the communications controller 330, the control system 300 can upload any of the data stored, maintained, or tracked by the control system 300 to a remote computing device, such as the device 334. The control system 300 can also download various operational data, such as therapy selection and parameters, firmware and software patches and upgrades, and the like (for example, via the connection to the device 334). The one or more additional processors 380, such as processor for controlling one or more user interfaces (such as, one or more displays), can be utilized. In some cases, any of the illustrated or described components of the control system 300 can be omitted depending on an embodiment of a wound monitoring or treatment system in which the control system 300 is used.

Any of the negative pressure wound therapy devices described herein can include one or more features disclosed in U.S. Pat. No. 9,737,649 or U.S. Patent Publication No. 2017/0216501, each of which is incorporated by reference in its entirety.

Multiple Dressing Negative Wound Therapy

Figure 4:
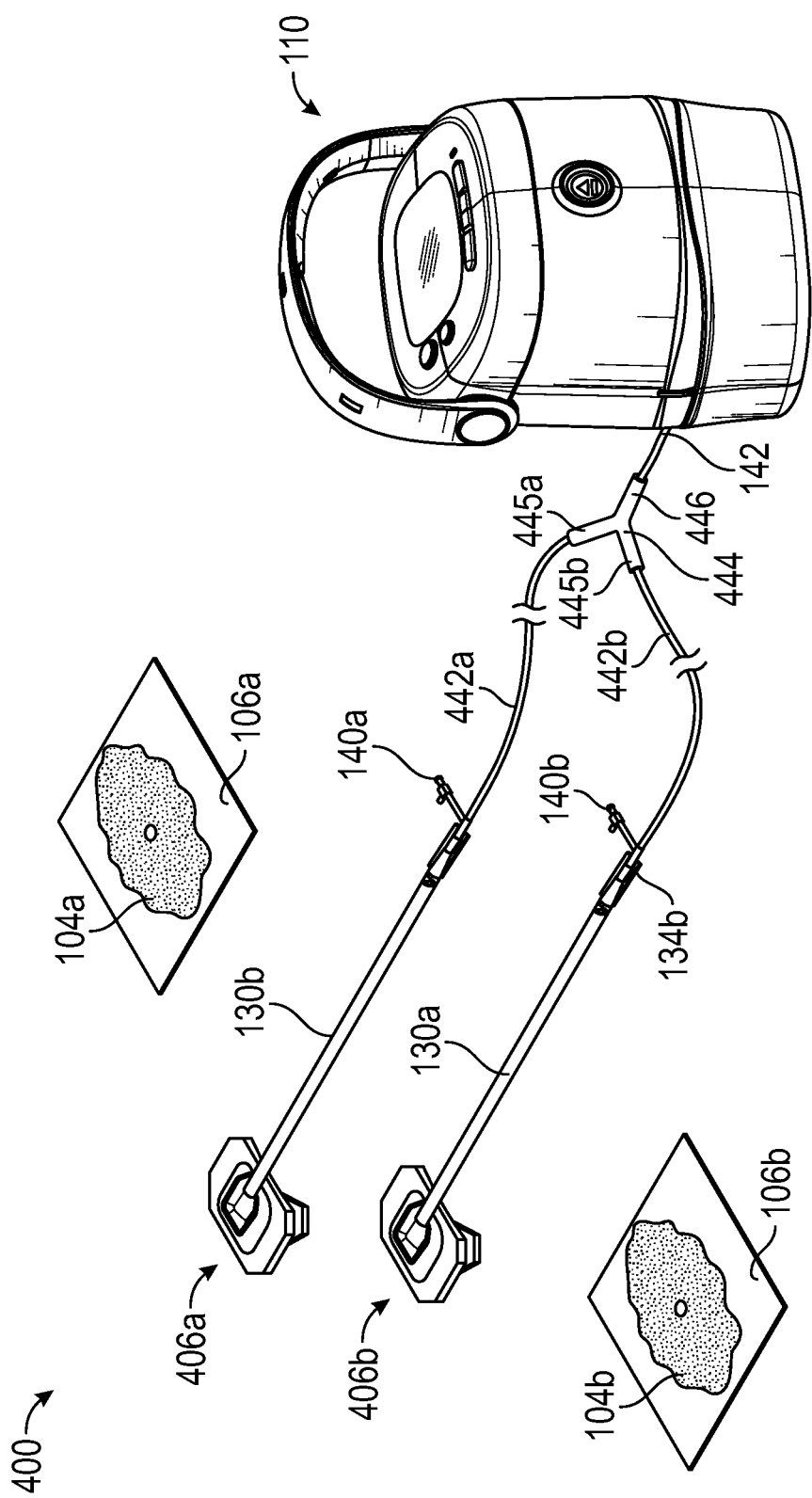
FIG. 4 illustrates another negative pressure wound therapy system.

FIG. 4 illustrates another negative pressure wound treatment system 400. The system 400 can include a wound therapy device capable of supplying negative pressure to the wound site or sites, such as wound therapy device 110'. The wound therapy device 110' can be in fluidic communication with one or more wound dressings 406a, 406b (collectively referred to as 406) so as to supply negative pressure to one or more wounds, such as the wounds 104a and 104b. A first fluid flow path can include components providing fluidic connection from the wound therapy device 110' to the first wound dressing 406a. As a non-limiting example, the first fluid flow path can include the path from the wound dressing 406a to the wound therapy device 110' or the path from the first wound dressing 406a to an inlet 446 of a branching attachment (or connector) 444 in fluidic connection with the wound therapy device 110'. Similarly, a second fluid flow path can include components providing fluidic connection from the wound therapy device 110' to the second wound dressing 406b.

The system 400 can be similar to the system 100' with the exception that multiple wounds 104a and 140b are being treated by the system 400. The system 400 can include any one or more of the components of the system 100', which are illustrated in FIG. 4 with appended letter "a" or "b" to distinguish between the first and second wounds (such as, the wounds 104a and 104b, the covers 106a and 106b). As illustrated, the system 400 can include a plurality of wound dressings 406a, 406b (and corresponding fluid flow paths) in fluidic communication with the wound therapy device 110' via a plurality of suction adapters, such as the adapter 108'. The suction adapters can include any one or more of the components of the adapter 108', which are illustrated in FIG. 4 with appended letter "a" or "b" to distinguish between the first and second wounds (such as, the bridge portions 130a and 130b, the connectors 134a and 134b, and the caps 140a and 140b).

The wound therapy device 110' can be fluidically coupled via the tube 142 with the inlet 446 of the connector 444. The connector 444 can be fluidically coupled via branches 445a, 445b and tubes or conduits 442a, 442b with the connectors 134a, 134b, which can be fluidically coupled with the tubes or conduits 130a, 130b. The tubes or conduits 130a, 130b can be fluidically coupled with the dressings 406a, 406b. Once all conduits and dressing components are coupled and operably positioned, the wound therapy device 110' can be activated, thereby supplying negative pressure via the fluid flow paths to the wounds 430a, 430b. Application of negative pressure can be applied until a desired level of healing of the wounds 430 is achieved. Although two wounds and wound dressing are illustrated in FIG. 4, some implementations of the wound therapy device 110' can provide treatment to a single wound (for instance, by closing the unused branch 445a or 445b of the connector 444) or to more than two wounds (for instance, by adding branches to the connector 444).

The system 400 can include one or more features disclosed in U.S. Patent Publication No. 2020/0069850 or International Publication No. WO2018/167199, each of which is incorporated by reference in its entirety.

Self-Testing of Negative Pressure Devices

In some cases, a negative pressure wound therapy device (such as, the device 110) may need to be tested to ensure that it is capable of providing negative pressure wound therapy safely and effectively. Such testing may involve verifying one or more of: that the leak rate of the device is within acceptable limits, that the negative pressure source provides adequate flow, that an excessive pressure safety system is operational, the efficiency (or health) of the negative pressure wound therapy device or the like. The testing can additionally or alternatively involve one or more of: prompting the user to press one or more of the buttons (such as, the buttons 184) of the user interface to confirm normal operation, confirm that the display (such as the display 172) is illuminated, confirm that one or more of the status indicators (such as, the status indicators 174) are illuminated, confirm that the speaker (such as, the speaker 192) is operational, or the like. The testing may be performed when the device is used with a new patient, periodically (such as, semi-annually), or the like. The testing parameters, such as the timing and pressure settings, can be varied to accommodate different self-test hardware designs. For example, the pressure can be varied from about −40 mmHg to about −250 mmHg. Existing devices are typically sent by the user (such as, a patient or health care provider (HCP), or the like), to the device manufacturer or a third-party for testing. However, this approach is time consuming, expensive, and disruptive.

Figure 5:
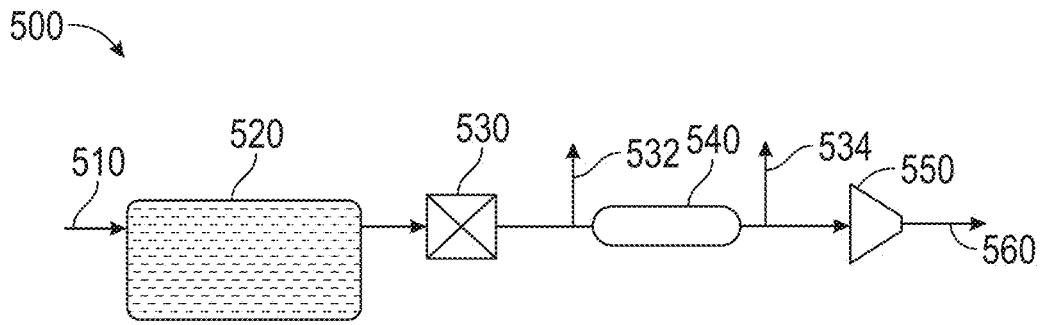
FIG. 5 illustrates a negative pressure wound therapy device configured to perform self-testing.

FIG. 5 illustrates a negative pressure wound therapy device 500 configured to perform self-testing. Device 500 can include one or more features of any of the devices described herein, such as the device 110. Device 500 may be capable of performing self-testing in the field without the need to send the device to the manufacturer or third-party. For example, the user can cause the device 500 to perform self-testing. Self-testing can be activated, for instance, via the user interface of the device, such as via the display 206. Self-testing can be initiated remotely. Device 500 can provide an indication to the user (who may be local or remote) or a remote computing system that self-testing has completed successfully or unsuccessfully. The indication can be provided using any of the approaches described herein, such as visually, audibly, tactilely, via remote transmission, or the like. The indication can include information regarding which particular test or tests have been completed successfully or failed. In some cases, responsive to a determination that self-testing has completed unsuccessfully, the indication can include disabling provision of negative pressure wound therapy.

Device 500 can include an inlet 510, a canister 520 (which can be optional), and a negative pressure source (positioned in the direction indicated by the arrow 560). In a canisterless system, the inlet 510 can be similar to the connector 430 illustrated in FIG. 4A. A one-way valve or check valve 550 can be included to ensure that the fluid flows downstream toward the negative pressure source (in the direction indicated by the arrow 560) and not in the opposite direction, for example, when the negative pressure source is deactivated or stopped. The check valve 550 can stop any reverse flow when the negative pressure source is stopped. The device 500 can include a valve 530, a flow restrictor 540, and pressure sensors 532 and 534 positioned in the fluid flow path upstream and downstream of the flow restrictor 540. In some cases, the pressure sensors 532 and 534 can be replaced with a differential pressure sensor configured to measure pressure across the flow restrictor 540 and pressure in the fluid flow path. The fluid flow path can include the negative pressure source and other components that are internal to or integral with the negative pressure source, such as one or more connectors, manifolds, lumens, tubes, valves (for example, one or more valves of the negative pressure source), or the like. In some implementations, the flow restrictor 540 can be a valve, such as a solenoid valve (or solenoid) or a manually operated valve. For instance, the valve 530 can also be the flow restrictor. The flow restriction produced by the flow restrictor 540 can result in a known pressure drop across the pressure measured by the pressure sensors 532 and 534.

During normal operation in which the device 500 provides negative pressure to a wound covered by a wound dressing fluidically connected to the inlet 510, the valve 530 can remain open. Device 500 can regulate negative pressure in the fluid flow path based on a pressure signal from the pressure sensor 532 (and/or the pressure sensor 534). During self-testing, the valve 530 can be closed. The valve 530 can be a solenoid valve opened and closed by a controller (or one or more controllers) of the device 500 or a manually operated valve. Pressure sensors 532 and 534 can be checked during normal operation to verify that similar values of pressure are being detected. A limit (or threshold) can be set for the variation in the pressure detected by the pressure sensors 532 and 534. Responsive to a determination that the limit has been satisfied, a determination that self-test has failed can be made and an indication can be provided.

Figure 6:
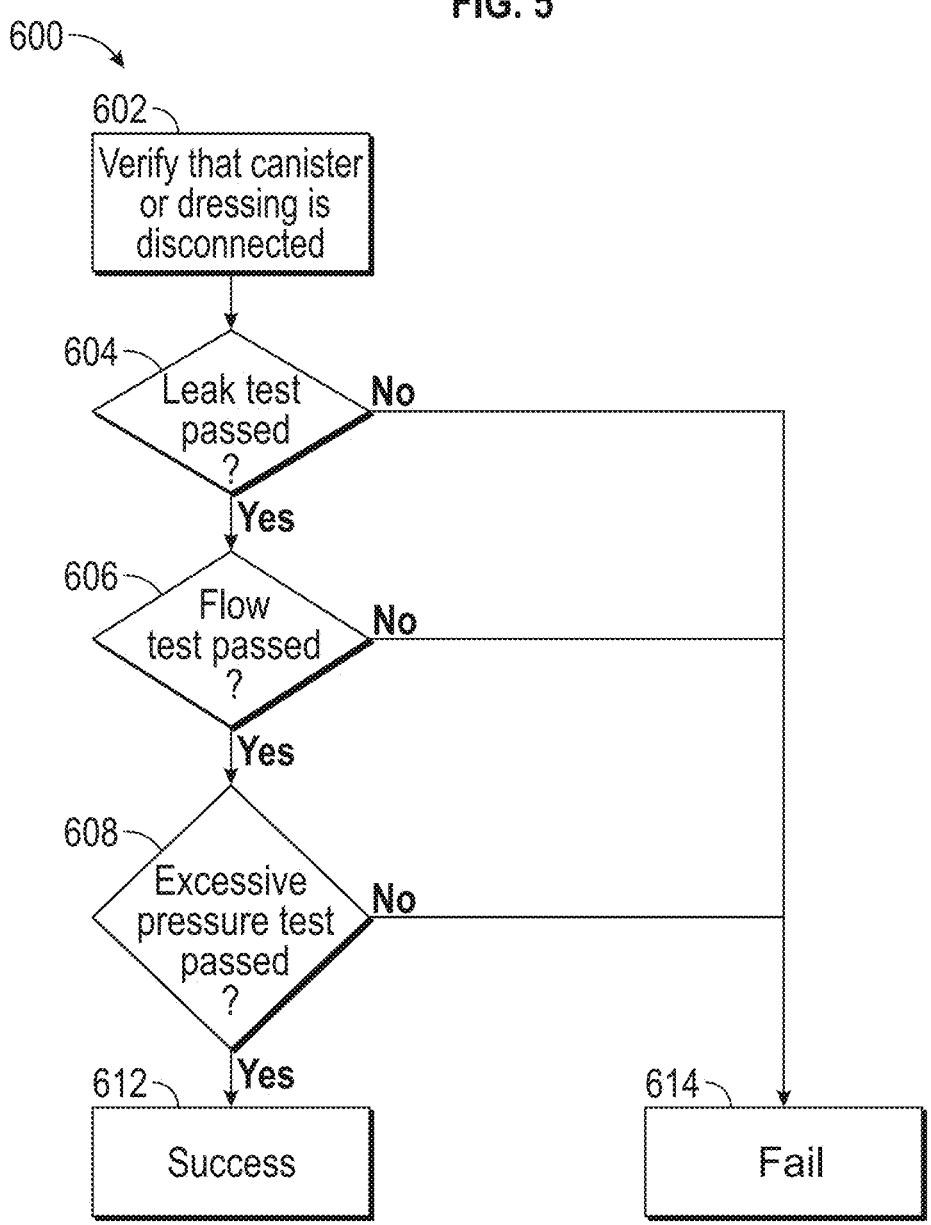
FIGS. 6 to 9 illustrate flow charts of tests that can be performed by the negative pressure wound therapy device of FIG. 5.

FIG. 6 illustrates a process 600 for performing self-testing. The process 600 can be implemented by the device 500, such as performed under control of a controller (or one or more controllers) of the device 500. In block 602, the process 600 can verify that the canister or wound dressing is disconnected. In some cases, the wound dressing can be connected to the canister. The process 600 can verify in block 602 that one or more of the wound dressing (for instance, in a canisterless system) or canister (for example, in a system with a canister) has been disconnected. This can be performed via one or more of a sensor, such as, an optical sensor, electromagnetic sensor (for example, a Hall effect sensors), electrical switch, mechanical switch, or the like. In some cases, self-testing can be performed without removing the canister. This may provide the benefit of having the canister filter act as a protection from particles (such as, dust or debris) entering the system and potentially causing damage to any of the components 530, 532, 534, 540, 550, or the negative pressure source.

It may be advantageous to remove one or more of the wound dressing or canister during self-testing in order to ensure there is no restriction to flow of fluid, establish a fixed volume in the fluid flow path subjected to self-testing, or the like. For example, due to unknown volume of fluid absorbed by the wound dressing, wound dressing fluidically connected to the device 500 can present a substantial restriction to the flow of fluid, which can cause inaccurate performance of self-testing. As another example, when the canister is present, self-testing may be performed inaccurately to due unknown volume of fluid that may be present in the canister (for example, fluid aspirated from the wound). As yet another example, safety may be promoted by not performing the excessive pressure test when the device is fluidically connected to a patient. In some cases, the process 600 can prompt the user to remove one or more of the canister or wound dressing. The process 600 can generate an indication in response to determining in block 602 that one or more of the wound dressing or canister has not been removed. The process 600 can terminate self-testing in response to determining in block 602 that one or more of the wound dressing or canister has not been removed.

The process 600 can transition to block 604 in which it can perform a leak test of the device. The leak test can be used to verify that the leak rate of the device is within acceptable limits for negative pressure wound therapy. If the leak test fails, the process 600 can transition to block 614. If the leak test passes, the process 600 can transition to block 606 and perform a flow test of the device. The flow test can be used to verify that the negative pressure source of the device provides adequate flow for negative pressure wound therapy. If the flow test fails, the process 600 can transition to block 614. If the flow test passes, the process 600 can transition to block 608 and verify that excessive pressure safety system of the device is operational. Excessive pressure safety system can prevent application of unsafe level(s) of negative pressure to the wound (for example, negative pressure of about −235 mmHg or less, about −240 mmHg or less or more, about −245 mmHg or less or more, about −250 mmHg or more, or the like). In some cases, excessive pressure safety system can include a valve or another mechanism that configured to release negative pressure in response to detection of excessive negative pressure level(s). For example, a valve can be opened to release excess negative pressure to the atmosphere. Excessive pressure safety system can alternatively or additionally include deactivating the negative pressure source or the device 500 in response to detection of excessive negative pressure level(s). If an excessive pressure test fails, the process 600 can transition to block 614. If the excessive pressure test passes, the process 600 can transition to block 612. In block 612, the process 600 can provide an indication that self-testing has completed successfully. In some cases, the order of the tests 604 to 608 can be different. For example, the flow test in block 606 can be performed before the leak test in block 604.

In block 614, the process 600 can provide an indication that self-testing has not completed successfully. Such indication can include information about which of the one or more tests have not completed successfully, as described herein.

Figure 7:
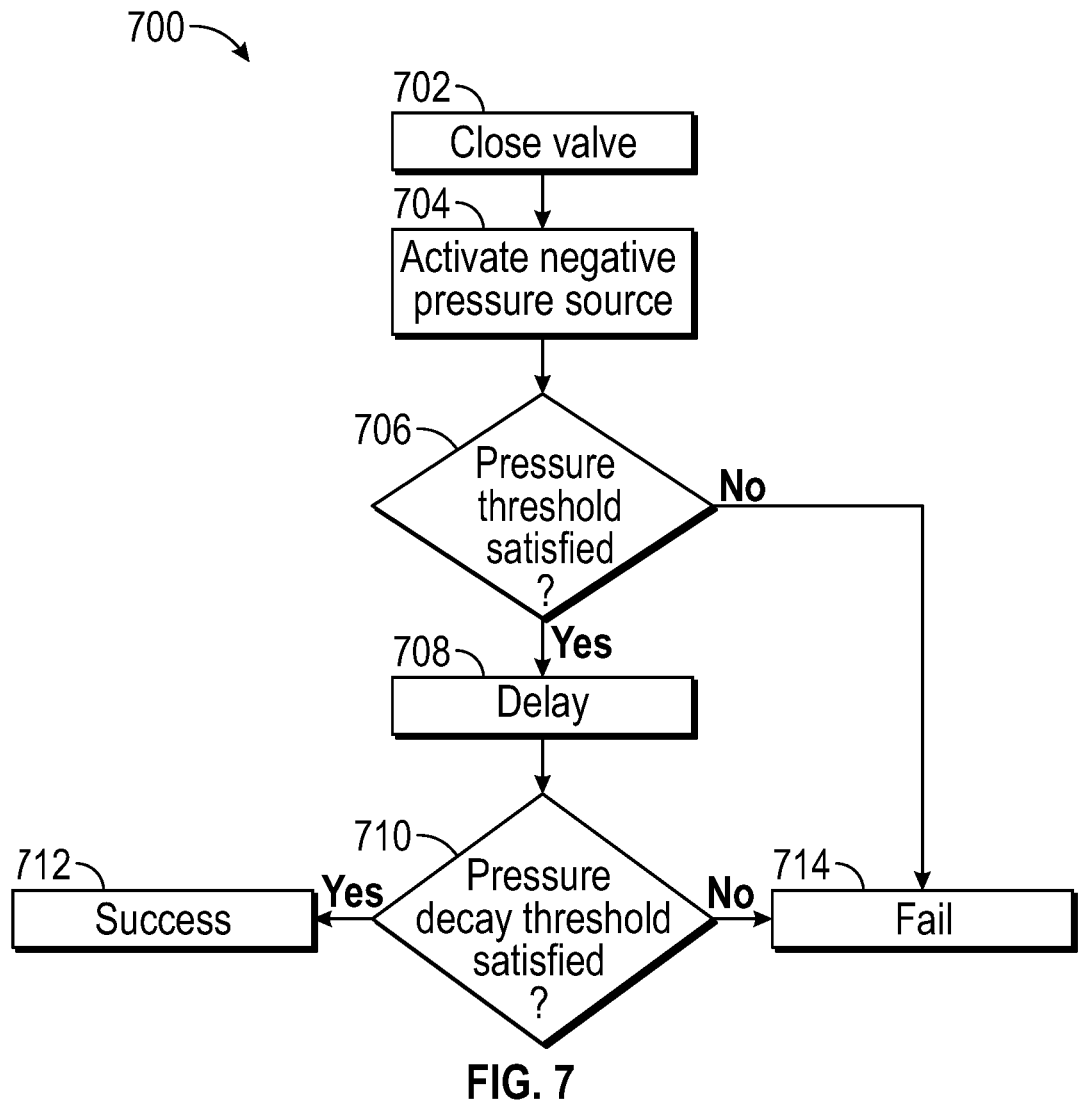

FIG. 7 illustrates a process 700 for the leak test. The process 700 can be performed in block 604 of FIG. 6. The process 700 can be implemented by the device 500, such as performed under control of a controller (or one or more controllers) of the device 500. The process 700 can begin in block 702 in which the valve 530 can be closed. In block 704, the process 700 can activate the negative pressure source. The process 700 can cause the negative pressure source to run at low intensity or low level of activity (such as, about 10% of the duty cycle (such as, PWM) or less or more, about 20% of the duty cycle (such as, PWM) or less or more, about 30% of the duty cycle or less or more, or the like). For example, the process 700 can cause low level of power to be supplied to an actuator (such as, a motor, piezoelectric transducer, or the like) of the negative pressure source. The process 700 can remain in block 704 until a first threshold level of negative pressure has been established in the fluid flow path. This can be verified by the pressure sensor 532 (or pressure sensor 534). The first threshold level of negative pressure can be at least about −100 mmHg, about −150 mmHg or less or more, about −160 mmHg or less or more, about −170 mmHg or less or more, about −180 mmHg or less or more, about −190 mmHg or less or more, about −200 mmHg or more, or the like. The first threshold level of negative pressure can be dependent on various factors, such as the type of negative pressure source being utilized by the device 500, type of wounds that the device 500 is configured to treat (for example, treating large wounds may necessitate that the device 500 be configured to provide greater levels of negative pressure and greater flow rates than treating small wounds), or the like.

In some cases, after the valve 530 has been closed, the volume of the fluid flow path may be quite small. Activating the negative pressure source and deactivating the negative pressure source when the first threshold level of negative pressure has been established (as may be normally performed during application of negative pressure wound therapy to a wound) can cause the negative pressure in the fluid flow path to reach a level that satisfies excessive negative pressure level(s). This may undesirably cause the excessive pressure safety system to be activated. To avoid such outcome, the actuator of the negative pressure source may be activated for a fixed period of time or a fixed duty cycle, after which pressure in the fluid flow path can be verified. Subsequently, the actuator can be activated again if needed to establish the first threshold level of negative pressure. For example, the actuator can be a motor that can be pulsed for a fixed period of time or pulsed for a single rotation (or multiple rotations). Subsequently, pressure in the fluid flow path can be verified, and the motor can be pulsed again if the first threshold level of negative pressure has not been established.

The process 700 can transition to block 706 in which it can verify that the first threshold level of negative pressure has been established in the fluid flow path. For example, the process 700 can verify that the pressure sensor 532 reads negative pressure level that is greater than (or more negative) or equal to the first threshold level of negative pressure. If the verification in block 706 is unsuccessful, the process 700 can transition to block 714 where it can provide indication that the leak test has failed. For example, the leak test can fail due to presence of one or more leaks in the fluid flow path that prevent the process 700 from establishing the first threshold level of negative pressure in the fluid flow path.

If the verification in block 706 is successful, the process 700 can transition to block 708. In block 708, the process 700 can implement a delay for a threshold period of time. The threshold period of time can be, for example, 1 second or less, 2 seconds or less or more, 5 seconds or less or more, 10 seconds or more, or the like. In block 708, the negative pressure source can be deactivated in order to allow negative pressure in the fluid flow path to decrease (or become more positive). Such negative pressure decay may be due to presence of one or more inherent leaks in the fluid flow path (for example, one or more connectors, manifolds, or valves, such as the valve 530, in the fluid flow path may have an inherent leak). As described herein, the threshold period of time for the delay can be dependent on various factors, such as type of negative pressure source being utilized by the device 500, the type of wounds that the device 500 is configured to treat, or the like.

After the threshold period of time has elapsed, the process 700 can transition to block 710 where it can verify that negative pressure decrease in the fluid flow path satisfies a pressure decay threshold. Even though one or more inherent leaks may be present in the fluid flow path, such leaks should not be too large or severe to cause a large negative pressure drop in the fluid flow path during the delay in block 708. The pressure decay threshold can be set to a relatively small value, such as 1 mmHg or less, 2 mmHg or less, 3 mmHg or less, 4 mmHg or less, 5 mmHg or less or more, 10 mmHg or less or more, 20 mmHg or less or more, 25 mmHg or less or more, or the like. As described herein, the pressure decay threshold can be dependent on various factors, such as the type of negative pressure source being utilized by the device 500, type of wounds that the device 500 is configured to treat, or the like. In block 710, the process 700 can utilize readings of the pressure sensor 532 or 534.

If the process 700 verifies in block 710 that the negative pressure in the fluid flow path satisfies the pressure decay threshold, the process 700 can transition to block 712 where it can indicate successful completion of the leak test. For example, in block 710, the process 700 can verify that negative pressure in the fluid flow path is greater than (or more negative) or equal to the difference between the first threshold level of negative pressure and the pressure decay threshold. If the verification in block 710 is unsuccessful, the process 700 can transition to block 714 where it can provide indication that the leak test has failed. This may be due to one or more leaks in the flow path causing the pressure decay to be too steep.

Figure 8:
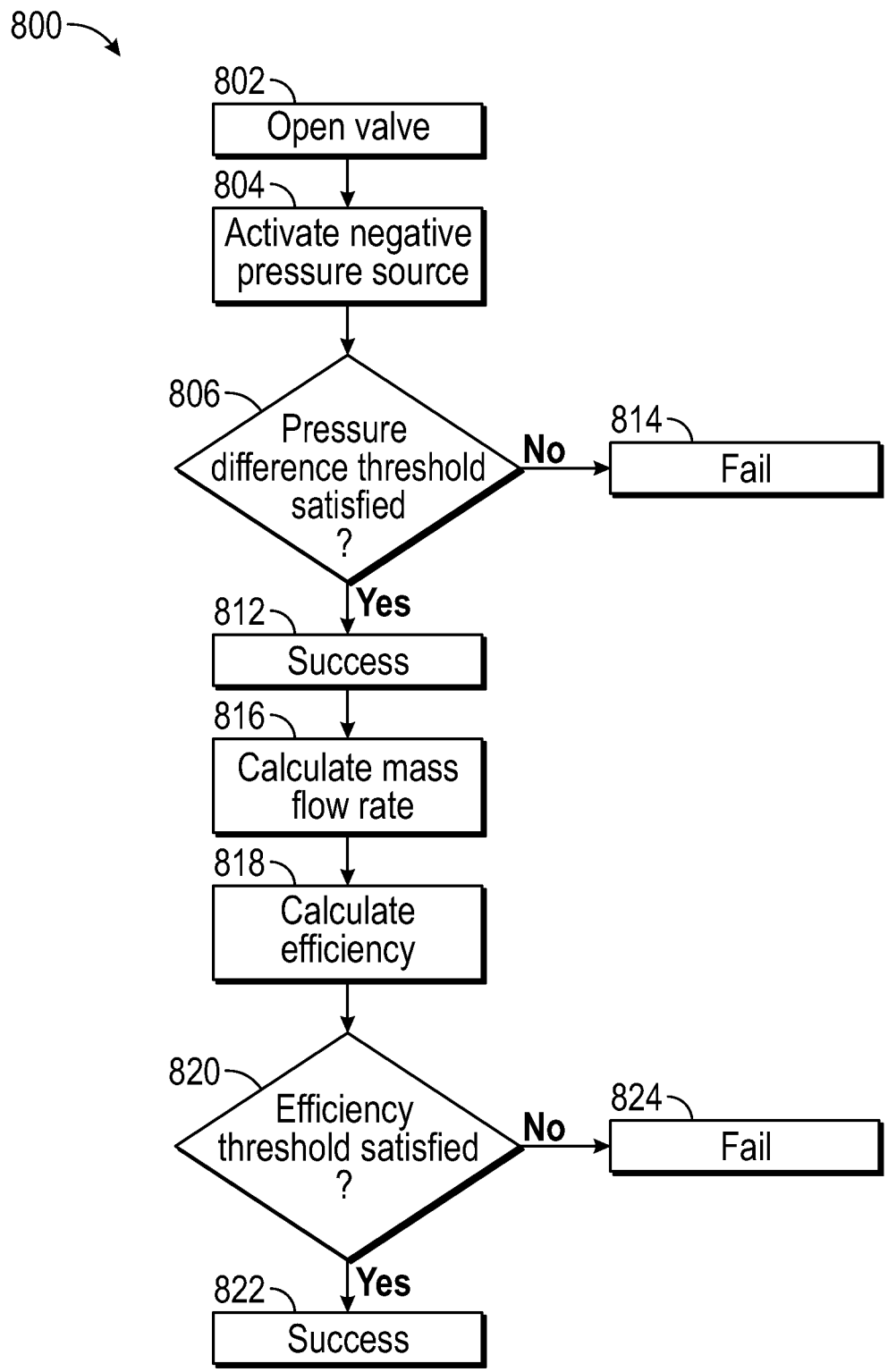

FIG. 8 illustrates a process 800 for the flow test. The process 800 can be performed in block 606 of FIG. 6. The process 800 can be implemented by the device 500, such as performed under control of a controller (or one or more controllers) of the device 500. The process 800 can begin in block 802 in which the valve 530 can be opened. In block 804, the process 800 can activate the negative pressure source. The process 800 can cause the negative pressure source to run at high intensity or maximum level of activity. For example, the process 800 can cause maximum level of power to be supplied to the actuator of the negative pressure source. In block 804, the process can cause the negative pressure to run for a threshold duration of time, such as about 1 second or less, about 2 seconds or less or more, about 3 seconds or less or more, about 4 seconds or less or more, about 5 seconds or less or more, about 6 seconds or less or more, about 7 seconds or less or more, about 8 seconds or less or more, about 9 seconds or less or more, about 10 seconds or more, or the like.

Block 804 can be executed to cause the negative pressure source to operate at highest or maximum flow (such as, highest or maximum duty cycle (such as, about 95% PWM or more)). Because such operation can cause significant increase in negative pressure in the fluid flow path, the process 800 can execute block 802 (to open the valve 530) in order to not cause the excessive pressure safety system to be activated, as described herein.

The process 800 can transition block 806 where it can verify that pressure difference across the flow restrictor 540 satisfies a pressure difference threshold indicative of adequate flow. Flow restrictor 540 can have cross-sectional area that is narrower than cross-sectional area of the other components in the fluid flow path. For example, the flow restrictor 540 can be one or more of thin, relatively long tube or conduit, a small orifice or aperture, or the like. As another example, the flow restrictor 540 can be a variable area flow restrictor with cross-sectional area that can be varied or adjusted (for example, by one or more controllers) so that undue burden is not placed on the negative pressure source to overcome the flow restriction caused by the flow restrictor during normal operation. For example, the flow restrictor 540 can be a butterfly valve, needle valve, ball valve, solenoid valve, or the like. As yet another example, a bypass tube or conduit with unrestricted cross-sectional area can be placed across the flow restrictor. During normal operation, fluid can flow across the bypass conduit. During self-testing, fluid can flow across the flow restrictor 540. Fluid flow can be directed to either the bypass conduit or the flow restrictor 540 by using one or more valves, such as one or more solenoid valves or the like. Additional details of the flow restrictor are disclosed in U.S. Pat. Nos. 8,974,429 and 9,636,440, each of which is incorporated by reference in its entirety.

As a result of restricting the fluid flow, pressure difference can be created across the flow restrictor 540. Such pressure difference can be determined by the pressure sensors 532 and 534. Pressure difference measurements can be used to determine the flow rate in the fluid flow path as the pressure difference can be proportional to the flow rate. For example, the pressure difference can be proportional to the flow rate such that increase in the flow rate can cause increase in the pressure difference. In some cases, because the valve 530 has been opened in block 802, the pressure sensor 532 can measure atmospheric pressure. Pressure sensor 534 positioned downstream of the flow restrictor 540 can measure more negative pressure due to the restriction of flow caused by the flow restrictor. In block 806, measured pressure difference can be compared to the pressure difference threshold. The pressure difference threshold can be about 5 mmHg or less, 10 mmHg or less or more, about 15 mmHg or less or more, about 20 mmHg or more, or the like. The pressure difference threshold can be dependent on various factors, such as type of negative pressure source being utilized by the device 500, the type of wounds that the device 500 is configured to treat, flow rate through the flow path, or the like.

If the process 800 determines that the pressure difference across the flow restrictor 540 satisfies the pressure difference threshold, it can transition to block 812 where it can indicate successful completion of the flow test. For example, the process 800 can transition to block 812 in response to determining that the pressure difference is greater than or equals the pressure difference threshold. If the verification in block 806 is unsuccessful, the process 800 can transition to block 814 where it can provide indication that the flow test has failed. For example, the process 800 can transition to block 814 in response to determining that the pressure difference is smaller than the pressure difference threshold. Failure of the flow test may be due to failure of one or more components of the negative pressure source (such as the actuator), blockage in the fluid flow path, or the like.

In some cases, after transitioning to block 812, the process 800 can test the health of the negative pressure wound therapy device. The device health can be determined based on the efficiency of the negative pressure source (such as, the pump). The efficiency can be determined as the ratio of power out to power in using Equation 1

$$\text{Efficiency}(\eta) = \frac{\text{Power Out}}{\text{Power in}} = \frac{\text{mass flow rate} \times \text{specific work}}{\text{current} \times \text{voltage}} = \frac{\text{mass flow rate} \times \frac{\Delta P}{\rho_{air}}}{\text{current} \times \text{voltage}} \qquad (1)$$

Power in can reflect the power consumed by the negative pressure source. Power in can be determined as a product of current and voltage supplied to the negative pressure source. In some implementations, the current can be measured and calculated via a sense resistor and, optionally, an amplifier. The sense resistor can be placed in series with the negative pressure source. The output from the sense resistor (which can be voltage across the resistor) can be fed into an amplifier. The amplifier can amplify the voltage, which may be small due to small resistance of the resistor. The current provided to the negative pressure source can be calculated using Ohm's law (voltage output by the amplifier/resistance of the resistor).

Power out can be indicative of the actual performance of the negative pressure source (such as, power output by the negative pressure source). According to Equation 1, power out can be calculated via determining mass flow rate and specific work. Mass flow rate can be calculated using Equation 4. To determine the mass flow rate, volumetric flow rate ($\dot{V}$) and density of air ($\rho_{air}$) can be utilized. Volumetric flow rate can be indicative of the volume of fluid that passes over time. As described herein (such as, in connection with the block 806), change in pressure across the flow restrictor 540, which can be measured as the difference between the pressure readings by the pressure sensors 532 and 534, can be indicative of the volumetric flow rate. In some cases, the flow restrictor 540 can be modeled to determine the relationship between the flow (or volumetric flow rate) and the change of pressure. For example, Bernoulli's equation can be used. In some instances, the relationship can be linear.

$$\text{Volumetric flow rate} = \dot{V} \qquad (2)$$

$$\text{Specific work} = W = \frac{\Delta P}{\rho_{air}} \qquad (3)$$

$$\text{Mass flow rate} = \dot{M} = \rho_{air} \times u \times A = \rho_{air} \times \dot{V} \qquad (4)$$

$$\text{Density of air} = \rho_{ir} = \frac{P_{absolute(atmospheric)}}{R_{specific} \times T} \qquad (5)$$

In some instances, mass flow rate can be measured directly, such as, by using a flow sensor (or flow meter. For instance, a hot wire sensor can be used.

Density of air can change with the temperature and altitude. Equation 5 can be used to determine the density at a specific temperature and altitude. In this equation, Pabsolute(atmospheric) is the atmospheric pressure (in Pascal), Rspecific is the specific gas constant for dry air (287.058 JKg$^{-1}$K$^{-1}$), and T is the temperature (in Kelvin). In some cases, density of air at room temperature (20 degrees Celsius) and mean sea-level atmospheric pressure (101.325 kPa) can be used, which equals to 1.2041 kg/m$^3$. According to Equation 3, specific work (W) can be determined as the ratio of the pressure difference (between pressures measured by the pressure sensors 532 and 534) and density of air. In some instances, the pressure difference can be compared to a threshold, which can indirectly provide the measure of specific work. For instance, the negative pressure source can be operated at maximum intensity (to provide maximum flow) and the pressure difference can be compared to a threshold associated with the specific work when maximum flow is being provided. The threshold can be adjusted for the density of air, as explained herein. If the threshold is satisfied (such as, met or exceeded), a predetermined value of specific work (associated with providing maximum flow) can be used for calculating the efficiency.

In block 816, the process can determine the mass flow rate. By determining the mass flow rate, efficiency of the negative pressure source can be calculated in a variety of temperature and pressure conditions (such as, at different altitudes). In some cases, an indication of the mass flow rate can be provided (such as, displayed).

The process 800 can transition to block 818, in which the efficiency of the negative pressure source can be determined. The efficiency can be calculated using Equation 1, as described above. The process 800 can transition to block 820, in which the efficiency determined in block 818 can be compared to an efficiency threshold. The efficiency threshold can be indicative of the efficiency of the device determined before the negative pressure wound therapy device has been put into use. For example, the efficiency threshold can be indicative of the efficiency of the device determined at manufacturing. If the determined efficiency satisfies the efficiency threshold (such as, equal or within 1%, 2%, 5%, or 10% of the efficiency threshold), the process can transition to block 822 indicating the device has passed the health test. For instance, a diaphragm pump can be about 20% efficient. The efficiency threshold can be set at 15% efficiency (or more or less). Not meeting the efficiency threshold may signify that the negative pressure source is unable to deliver negative pressure wound therapy or is able to do so while producing too much heat. If in block 818 it is determined that the efficiency does not satisfy the efficiency threshold, the process 800 can transition to block 824 indicating the negative pressure wound therapy device failed the health test. Health can be determined as a ratio between the efficiency of the device determined before the negative pressure wound therapy device has been put into use and the efficiency determined in block 818. The determined health value can be provided to the user, such as displayed. The process of checking the device health can advantageously allow the user to determine the health of the device and whether the device should be serviced without needing to send the device into a service and repair center. In some implementations, the health test can be performed separately from the flow test.

Figure 9:
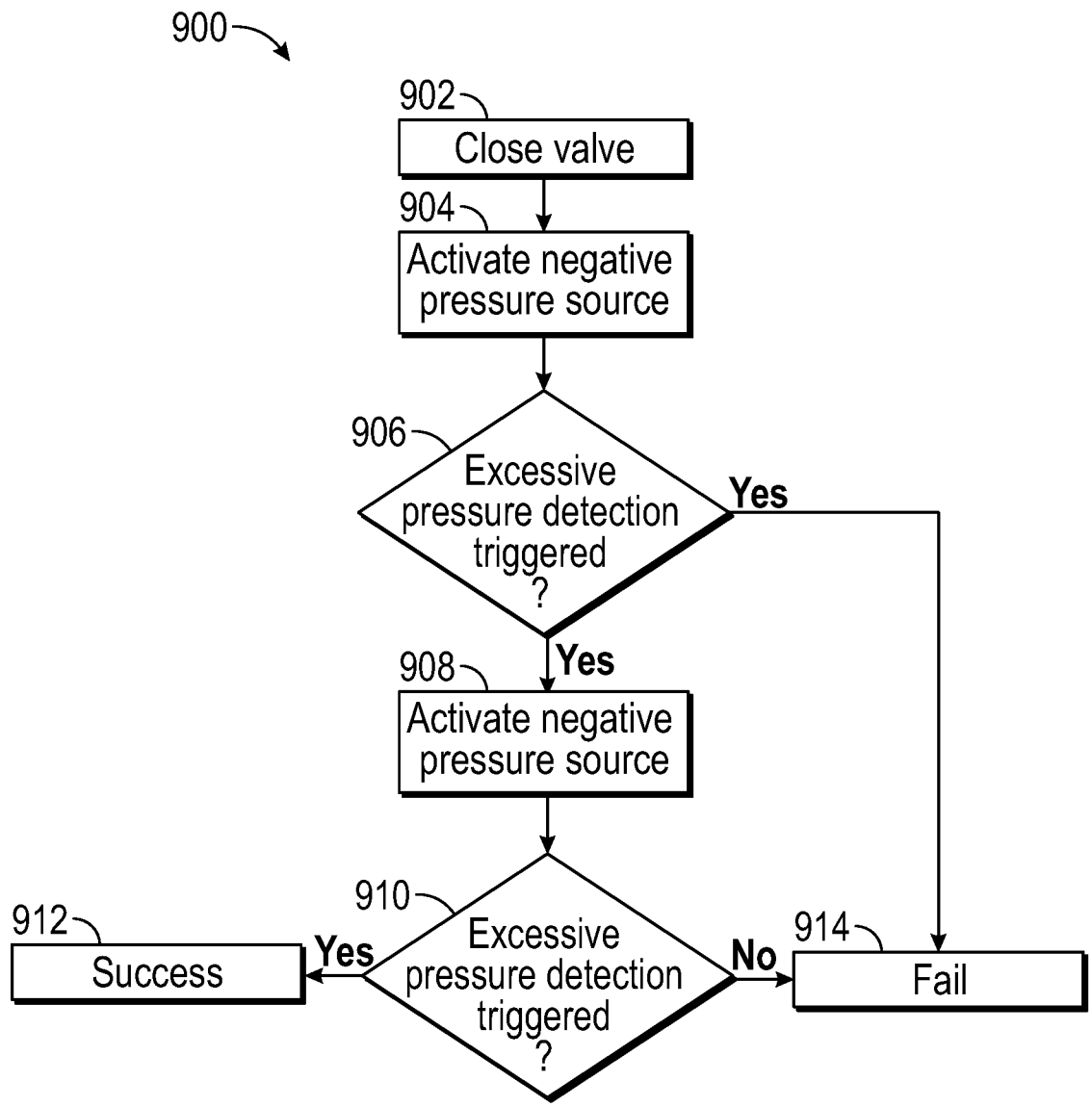

FIG. 9 illustrates a process 900 for the excessive pressure test. The process 900 can be performed in block 608 of FIG. 6. The process 900 can be implemented by the device 500, such as performed under control of a controller (or one or more controllers) of the device 500. The process 900 can begin in block 902 in which the valve 530 can be closed. In block 904, the process 900 can activate the negative pressure source. Similar to block 704 of FIG. 7, in block 904, the process 900 can cause the negative pressure source to run at low intensity or low level of activity. For example, the process 900 can cause low level of power to be supplied to the actuator of the negative pressure source. Same or different intensity level or low activity level can be used as in block 704.

The process 900 can remain in block 904 until a second threshold level of negative pressure has been established in the fluid flow path. This can be verified by the pressure sensor 532 (or pressure sensor 534). The second threshold level of negative pressure can correspond to negative pressure that is just less than (or more positive) than an excess (or excessive) pressure threshold indicative or unsafe level(s) of negative pressure (for example, negative pressure of about −235 mmHg or less, about −240 mmHg or less or more, about −245 mmHg or less or more, about −250 mmHg or more, or the like). For instance, the second threshold level of negative pressure can be about −200 mmHg or less, about −210 mmHg or less or more, about −220 mmHg or less or more, about −230 mmHg or less or more, −250 mmHg or less or more, or the like.

When the second threshold level of negative pressure has been established in the fluid flow path, the process 900 can transition to block 906 in which it can verify that the excessive pressure safety system has not been activated. Unless there is a fault, the excessive pressure safety system should not be activated because negative pressure in the fluid flow path has not reached the excess pressure threshold. If such verification fails, the process 900 can transition to block 914 where it can provide indication that the excessive pressure test has failed.

If the verification in block 906 is successful, the process 900 can transition to block 908 and activate the negative pressure source. Block 908 can be similar to block 904 except that the process 900 can remain in block 908 (with the negative pressure source being active) until the negative pressure level in the fluid flow path satisfies the excess pressure threshold. For example, the process 900 can remain in block 908 until negative pressure in the fluid flow path reaches or exceeds the excess pressure threshold. This verification can be performed by pressure sensor 532 (or pressure sensor 534). Subsequently, the process 900 can transition to block 910 where it can verify that the excessive pressure safety system has been activated (for example, the negative pressure source has been deactivated). In case the excessive pressure safety system includes another valve configured to vent excessive pressure into the surrounding environment, the process 900 can include activating the negative pressure source in block 908 at a different level of intensity (such as, the maximum level of intensity) to verify that the excess pressure threshold cannot be achieved. For instance, the level of intensity can be higher than the one described herein in connection with segment 1130 of FIG. 11. If such verification fails, the process 900 can transition to block 914. If the verification in block 910 is successful, the process 900 can transition to block 912 where it can indicate successful completion of the excessive pressure test.

In some cases, the process 900 can additionally or alternatively execute the flow test of the process 800. If the flow test fails (such as, the process 800 reaching block 814), it can be concluded that the excessive pressure safety system has been activated. If the flow test is successfully completed (such as, the process 800 reaching block 812), it can be concluded that the excessive pressure safety system has not been activated. In some instances, the flow test can be executed before transitioning from block 910 to 912. Executing the flow test can provide additional or alternative verification regarding activation of the excessive safety system.

Figure 10:
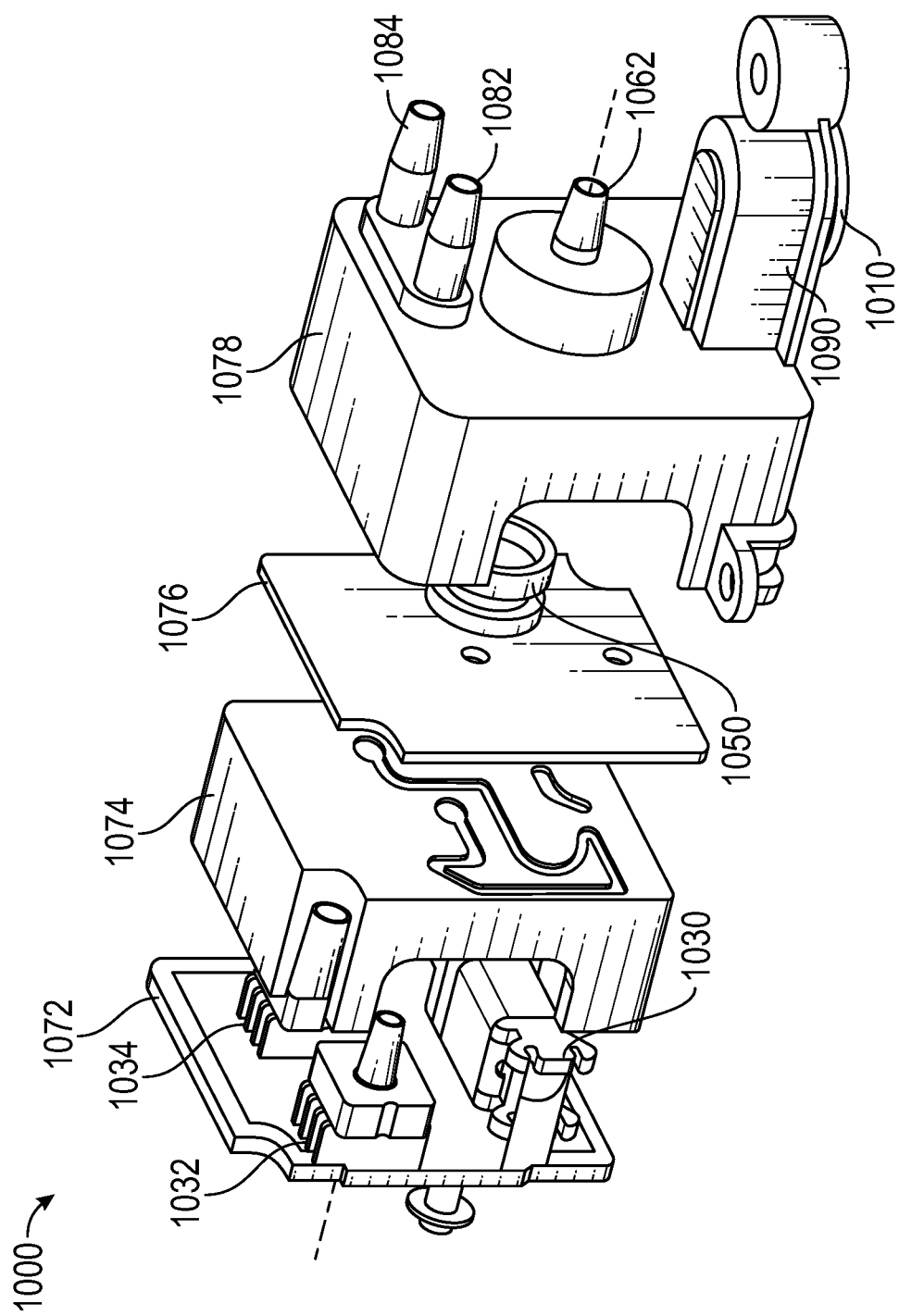
FIG. 10 illustrates a manifold that can be utilized by the negative pressure wound therapy device of FIG. 5.

FIG. 10 illustrates a manifold 1000 that can be utilized by the negative pressure wound therapy device of FIG. 5. The manifold 1000 can incorporate one or more of a valve 1030 (which can correspond to the valve 530), pressure sensors 1032 and 1034 (which can correspond to the pressure sensors 532 and 534), flow restrictor 1090 (which can correspond to the flow restrictor 540), check valve 1050 (which can correspond to the check valve 550), or connections between any of these components. The manifold 100 can include an electronics board 1072 (for example, circuit board) supporting pressure sensors 1032 and 1034, which can correspond to the pressure sensors 532 and 534, respectively. The electronics board 1072 can support a valve 1030, which can correspond to the valve 530. The valve 1030 can be a solenoid valve.

The manifold 1000 can formed from parts or housings 1074 and 1078 separated by a membrane or gasket 1076. The gasket 1076 can be designed to provide a fluid-tight seal when the housings 1074 and 1078 are connected. The housings 1074 and 1078 can be glued together, welded together (for example, using ultrasonic welding), or the like. The housing 1074 can support the electronics board 1072. The gasket 1076 can support a check valve 1050, which can correspond to the check valve 550. In some cases, the check valve 1050 can be positioned external to the manifold 1000.

The housing 1078 can include an inlet 1012, which can be fluidically connected to a canister (if present, or to a dressing in a canisterless system) and located downstream of the canister. With reference to FIG. 5, the inlet 1012 can be positioned on a side of the canister 520 opposite the inlet 510. The inlet 1012 can be similar to the connector 430 illustrated in FIG. 4A. The housing 1078 can include an outlet 1062, which can be fluidically connected to the negative pressure source. The outlet 1062 can be positioned at or near location indicated by the arrow 560 in FIG. 5. The housing 1078 can include an outlet 1082 fluidically connected to an exhaust of the negative pressure source. The housing 1078 can include a silencer configured to reduce noise, vibration, or the like produced by the negative pressure source during operation or one or more filters configured to prevent one or more of odor, bacteria, or the like from being released into the surrounding environment. The housing 1078 can include an outlet 1084 fluidically connected to an exhaust (such as, external atmosphere) to expel gas after it has passed through the silencer. In some cases, the silencer can be external to the manifold and outlets 1082 and 1084 may be omitted. Additional details of the silencer and one or more filters are disclosed in U.S. Pat. No. 8,845,603 and U.S. Patent Publication No. 2018/0318476, each of which is incorporated by reference in its entirety.

A flow restrictor 1090, which can correspond to the flow restrictor 540, can be integrated into the manifold 1000. For example, the flow restrictor 1090 can be positioned in the housing 1074. The flow restrictor can be placed between the inlet 1012 and the outlet 1062. In some cases, the flow restrictor 1090 can be a solenoid valve. In cases when the valve 1030 functions as the flow restrictor, component 1090 can be omitted.

Additional details of the manifold are disclosed in U.S. Pat. Nos. 9,084,845 and 9,427,505 and U.S. Patent Publication No. 2018/0318476, each of which is incorporated by reference in its entirety.

Use of the manifold 1000 or another modular unit can advantageously allow for efficient troubleshooting, for instance, in case one or more tests conducted during self-testing fail. For example, the manifold 1000 or another modular unit could be replaced in response to one or more of the processes 600, 700, 800, or 900 executing one or more of the blocks 614, 714, 814, or 914. Such design can allow the user to quickly replace one or more potentially faulty components that may have caused self-testing to fail. The manifold 1000 or another modular unit can be detachable from the device 500. During repair or service, removing a potentially faulty manifold 1000 or another modular unit and attaching a different manifold 100 or another modular unit to the device 500 can result in successful completion of self-testing. In some cases, the negative pressure source can be replaced along with the manifold 1000 or another modular unit. For example, the negative pressure source can be attached to or integrated in the manifold 1000 to form a replaceable modular unit.

Figure 11:
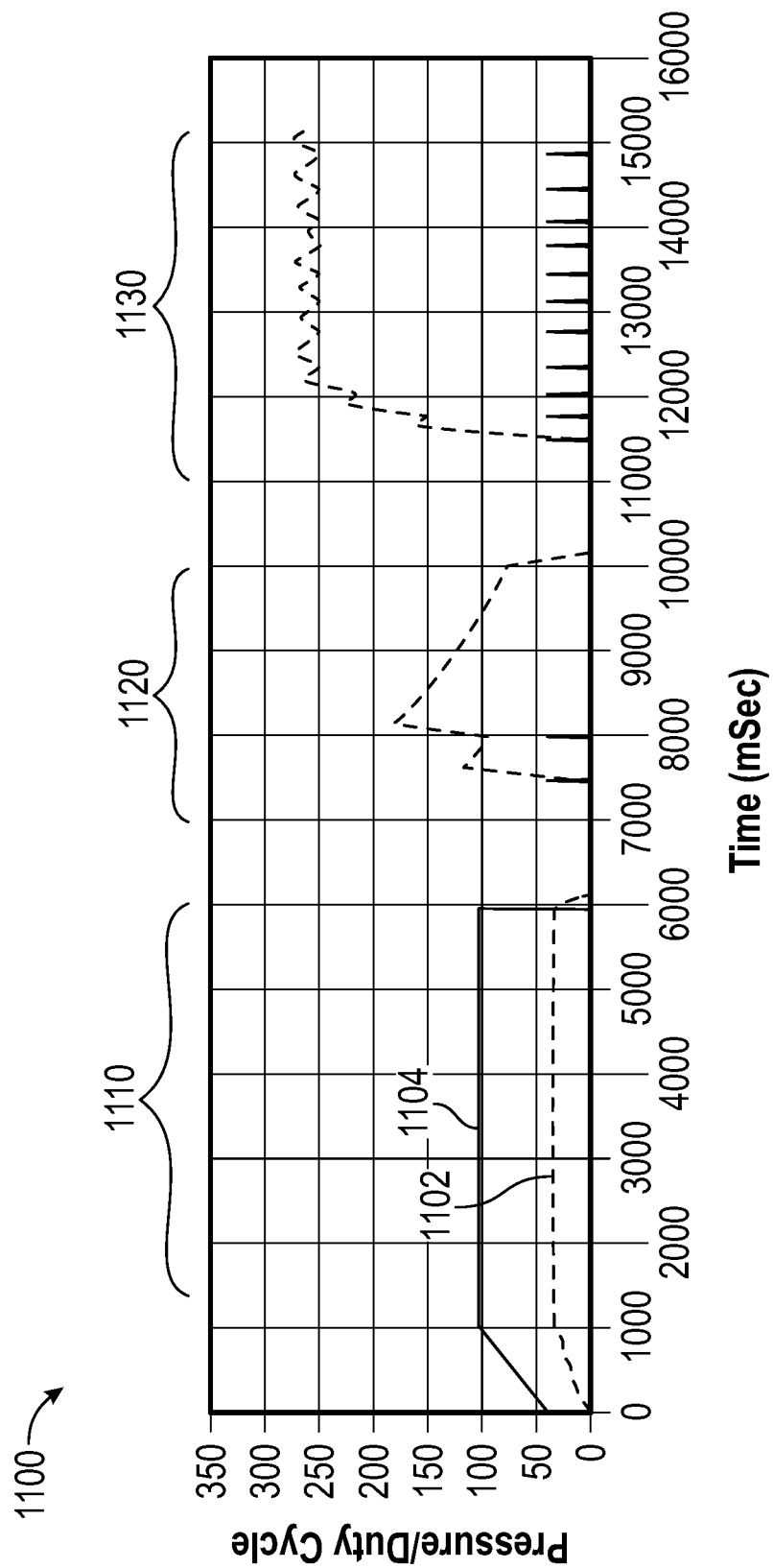
FIG. 11 illustrates a graph of several tests being performed by the negative pressure wound therapy device of FIG. 5.

FIG. 11 illustrates a graphical output 1100 of performing the flow test, leak test and excessive pressure test. X-axis can represent time. Y-axis can represent the pressure and duty cycle of the negative pressure source. Curve 1102 can represent pressure in the fluid flow path (as measured by one or more of the pressure sensors 532 or 534, such as, the pressure sensor 534). Curve 1104 can represent duty cycle of the negative pressure source.

The flow test is illustrated in segment 1110. The valve 530 can be open. As described herein, the negative pressure source can be run at highest or maximum flow. As illustrated, the curve 1104 can be at about 100% duty cycle (for instance, at 95% PWM). Pressure in the fluid flow path is illustrated by the curve 1102, which shows a steady pressure at around 35 mmHg. The flow test results can also be used to determine the device health or negative pressure source efficiency.

The leak test is illustrated in segment 1120. The valve 530 can be closed. As described herein, the negative pressure source can be run at low intensity or low level of activity. As illustrated by the curve 1104, the negative pressure source can be pulsed at 20% PWM (or less or more, as described herein). The pulses may be separated by a delay in time in order to protect the pressure sensor 532 or 534 from being damaged (such as, from establishing high negative pressure in the small volume of the fluid flow path with the valve 530 closed). As illustrated by the curve 1102, a leak can manifest itself with a large drop in the pressure in the fluid flow path. In some cases, the pressure sensor 534 located at the negative pressure source side of the flow restrictor 540 can be monitored to determine the leak.

The excessive pressure test is illustrated by the segment 1130. The valve 530 can be closed. As described herein, the negative pressure source can be run at low intensity or low level of activity. As illustrated by the curve 1104, the negative pressure source can be pulsed at 20% PWM (or less or more, as described herein). Each pulse can increase the negative pressure in the fluid flow path. As described herein, the pulses may be separated by delays in time to protect the pressure sensor 532 or 534 from being damaged. At the end of the segment 1130, the pressure in the fluid flow path can satisfy the excess pressure threshold.

Advantageously, self-testing improvements described herein can allow for more efficient and reliable self-testing of negative pressure devices. This can shorten negative pressure wound therapy interruptions and improve patient care.

Other Variations

Although some embodiments describe negative pressure wound therapy, the systems, devices, and/or methods disclosed herein can be applied to other types of therapies usable standalone or in addition to TNP therapy. Systems, devices, and/or methods disclosed herein can be extended to any medical device, and in particular any wound treatment device. For example, systems, devices, and/or methods disclosed herein can be used with devices that provide one or more of ultrasound therapy, oxygen therapy, neurostimulation, microwave therapy, active agents, antibiotics, antimicrobials, or the like. Such devices can in addition provide TNP therapy. The systems and methods disclosed herein are not limited to medical devices and can be utilized by any electronic device.

Any of the controllers or processors disclosed herein can include electronic circuitry (sometimes referred to as control circuitry). Electronic circuitry can be configured to implement programmable control or hardwired control.

Any value of a threshold, limit, duration, etc. provided herein is not intended to be absolute and, thereby, can be approximate. In addition, any threshold, limit, duration, etc. provided herein can be fixed or varied either automatically or by a user. Furthermore, as is used herein relative terminology such as exceeds, greater than, less than, etc. in relation to a reference value is intended to also encompass being equal to the reference value. For example, exceeding a reference value that is positive can encompass being equal to or greater than the reference value. In addition, as is used herein relative terminology such as exceeds, greater than, less than, etc. in relation to a reference value is intended to also encompass an inverse of the disclosed relationship, such as below, less than, greater than, etc. in relations to the reference value.

Features, materials, characteristics, or groups described in conjunction with a particular aspect, embodiment, or example are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. Those skilled in the art will appreciate that in some embodiments, the actual steps taken in the processes illustrated and/or disclosed may differ from those shown in the figures. Depending on the embodiment, certain of the steps described above may be removed, others may be added. For example, the actual steps and/or order of steps taken in the disclosed processes may differ from those shown in the figure. Depending on the embodiment, certain of the steps described above may be removed, others may be added. For instance, the various components illustrated in the figures or described herein may be implemented as software and/or firmware on a processor, controller, ASIC, FPGA, and/or dedicated hardware. The software or firmware can include instructions stored in a non-transitory computer-readable memory. The instructions can be executed by a processor, controller, ASIC, FPGA, or dedicated hardware. Hardware components, such as controllers, processors, ASICs, FPGAs, and the like, can include logic circuitry. Furthermore, the features and attributes of the specific embodiments disclosed above may be combined in different ways to form additional embodiments, all of which fall within the scope of the present disclosure.

User interface screens illustrated and described herein can include additional and/or alternative components. These components can include menus, lists, buttons, text boxes, labels, radio buttons, scroll bars, sliders, checkboxes, combo boxes, status bars, dialog boxes, windows, and the like. User interface screens can include additional and/or alternative information. Components can be arranged, grouped, displayed in any suitable order.

Conditional language used herein, such as, among others, "can," "could", "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied. Additionally, the words "herein," "above," "below," and words of similar import, when used in this application, refer to this application as a whole and not to any particular portions of this application.

Conjunctive language, such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each be present.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations.

Although the present disclosure includes certain embodiments, examples and applications, it will be understood by those skilled in the art that the present disclosure extends beyond the specifically disclosed embodiments to other alternative embodiments and/or uses and obvious modifications and equivalents thereof, including embodiments which do not provide all of the features and advantages set forth herein. Accordingly, the scope of the present disclosure is not intended to be limited by the specific disclosures of preferred embodiments herein, and may be defined by claims as presented herein or as presented in the future.

What is claimed is:

1. A negative pressure wound therapy device comprising:
   a negative pressure source configured to be connected, via a fluid flow path, to a wound covered by a wound dressing and provide negative pressure to a wound;
   a valve positioned in the fluid flow path and configured to, in an open state, permit supply of negative pressure from the negative pressure source upstream of the valve and, in a closed state, block supply of negative pressure from the negative pressure source upstream of the valve;

a flow restrictor positioned in the fluid flow path;
at least one pressure sensor configured to measure pressure in the fluid flow path and a pressure differential across the flow restrictor; and
a control circuitry configured to:
in a normal operational mode in which negative pressure is being applied to the wound dressing, cause the valve to be in the open state; and
in a test mode in which performance of the device is being verified, perform at least one of a leak test, a flow test, or an excessive pressure test, wherein the test mode is not performed when negative pressure is being applied to the wound dressing, and wherein:
the leak test comprises the control circuitry being configured to: cause the valve to be closed, cause the negative pressure source to operate at a first intensity level, cause the negative pressure source to pause operation for a duration of time, and indicate presence of a leak in the fluid flow path in response to determining that a change in the negative pressure measured by the at least one pressure sensor subsequent to expiration of the duration of time satisfies a threshold indicative of a leak;
the flow test comprises the control circuitry being configured to: cause the valve to be opened, cause the negative pressure source to operate at a second intensity level, and indicate insufficient flow in response to determining that a pressure differential across the flow restrictor measured by the at least one pressure sensor satisfies a pressure differential threshold indicative of insufficient flow; and
the excessive pressure test comprises the control circuitry being configured to: cause the valve to be closed, cause the negative pressure source operate at a third intensity level, and indicate fault in a system configured to protect against unsafe negative pressure in the fluid flow path in response to determining that pressure in the fluid flow path satisfies a threshold indicative of unsafe negative pressure and the system configured to protect against unsafe negative pressure has not been activated.

2. The device of claim 1, wherein the second intensity level is greater than the first intensity level, and wherein the first intensity level is equal to the third intensity level.

3. The device of claim 1, wherein the valve comprises a solenoid valve.

4. The device of claim 1, wherein the at least one pressure sensor comprises a first pressure sensor positioned upstream of the flow restrictor and a second pressure sensor positioned downstream of the flow restrictor.

5. The device of claim 1, further comprising a canister configured to be positioned in the fluid flow path and collect fluid aspirated from the wound, wherein the control circuitry is further configured to, in the test mode, verify that the canister has been removed from the fluid flow path.

6. The device of claim 5, wherein the control circuitry is further configured to, in the test mode, not perform the leak test, the flow test, and the excessive pressure test in response to a determination that the canister has not been removed and that the wound dressing has not been disconnected.

7. The device of claim 5, wherein the control circuitry is further configured to, in the test mode, provide an indication of at least one of that the canister has not been removed or that the wound dressing has not been disconnected.

8. The device of claim 1, wherein the system configured to protect against unsafe negative pressure in the fluid flow path comprises at least one of:
another valve positioned in the fluid flow path, the control circuitry configured to cause the another valve to open responsive to the pressure in the fluid flow path satisfying the threshold indicative of unsafe negative pressure; or
the control circuitry being further configured to deactivate the negative pressure source responsive to the pressure in the fluid flow path satisfying the threshold indicative of unsafe negative pressure.

9. The device of claim 1, wherein the excessive pressure test comprises the control circuitry being further configured to indicate fault in the system configured to protect against unsafe negative pressure in the fluid flow path in response to determining the system configured to protect against unsafe negative pressure has been activated when pressure in the fluid flow path does not satisfy the threshold indicative of unsafe negative pressure.

10. The device of claim 1, wherein the control circuitry is further configured to perform, in the test mode, a health test comprising determining efficiency of the negative pressure source and indicating sufficient health in response to determining that the efficiency satisfies an efficiency threshold.

11. The device of claim 10, wherein the control circuitry is configured to perform the health test following a successful completion of the flow test.

12. The device of claim 1, further comprising a check valve positioned in the fluid flow path, the check valve configured to permit fluid flow downstream toward the negative pressure source or an exhaust and prevent fluid flow in the opposite direction.

13. A negative pressure wound therapy device comprising:
a negative pressure source configured to be connected, via a fluid flow path, to a wound covered by a wound dressing and provide negative pressure to a wound;
a valve positioned in the fluid flow path and configured to, in an open state, permit supply of negative pressure from the negative pressure source upstream of the valve and, in a closed state, block supply of negative pressure from the negative pressure source upstream of the valve;
a flow restrictor positioned in the fluid flow path;
a pressure sensor configured to measure pressure in the fluid flow path; and
a control circuitry configured to:
in a normal operational mode in which negative pressure is being applied to the wound dressing, cause the valve to be in the open state; and
in a test mode in which performance of the device is being verified, perform at least one of a leak test or a flow test, wherein the test mode is not performed when negative pressure is being applied to the wound dressing, and wherein:
the leak test comprises the control circuitry being configured to: cause the valve to be closed, cause the negative pressure source to operate at a first intensity level, cause the negative pressure source to pause operation for a duration of time, and indicate presence of a leak in the fluid flow path in response to determining that a change in the negative pressure measured by the pressure sensor subsequent to expiration of the duration of time satisfies a threshold indicative of a leak; and the flow test comprises the control circuitry being configured to: cause the valve to be opened, cause the negative pressure source to operate at a second intensity level, and indicate insufficient flow in response to determining that a pressure difference across the flow restrictor measured by the pressure sensor satisfies a pressure difference threshold indicative of insufficient flow.

14. The device of claim 13, wherein the control circuitry is further configured to, in the test mode, perform at least one of the leak test, the flow test, or an excessive pressure test, wherein:

the excessive pressure test comprises the control circuitry being configured to: cause the valve to be closed, cause the negative pressure source operate at a third intensity level, and indicate fault in excessive pressure protection in response to determining that pressure in the fluid flow path satisfies a threshold indicative of unsafe negative pressure and the excessive pressure protection has not been activated.

15. The device of claim 14, wherein the excessive pressure protection comprises at least one of:

another valve positioned in the fluid flow path, the control circuitry configured to cause the another valve to open responsive to the pressure in the fluid flow path satisfying the threshold indicative of unsafe negative pressure; or the control circuitry being further configured to deactivate the negative pressure source responsive to the pressure in the fluid flow path satisfying the threshold indicative of unsafe negative pressure.

16. The device of claim 14, wherein the excessive pressure test comprises the control circuitry being further configured to indicate fault in the excessive pressure protection in response to determining the excessive pressure protection has been activated when pressure in the fluid flow path does not satisfy the threshold indicative of unsafe negative pressure.

17. The device of claim 13, wherein the second intensity level is greater than the first intensity level.

18. The device of claim 13, wherein the control circuitry is further configured to perform, in the test mode, a health test comprising determining efficiency of the negative pressure source and indicating sufficient health in response to determining that the efficiency satisfies an efficiency threshold.

19. A method of operating a negative pressure wound therapy device comprising:

by a control circuitry of the negative pressure wound therapy device:

at a first time, operating in a normal operational mode by causing:

a valve positioned in a fluid flow path to be opened to permit supply of negative pressure from a negative pressure source to a wound covered by a wound dressing; and causing the negative pressure source to apply negative pressure to the wound dressing covering the wound; and at a second time, initiating a test mode configured to verify performance of the negative pressure wound therapy device, the test mode comprising performing at least one of a leak test, a flow test, or an excessive pressure test, wherein the test mode is not performed when negative pressure is being applied to the wound dressing, and wherein:

the leak test comprises: causing the valve of the negative pressure wound therapy device to be closed to block supply of negative pressure from the negative pressure source upstream of the valve, causing the negative pressure source to operate at a first intensity level, causing the negative pressure source to pause operation for a duration of time, and indicating presence of a leak in the fluid flow path in response to determining that a change in the negative pressure subsequent to expiration of the duration of time satisfies a threshold indicative of a leak;

the flow test comprises: causing the valve to be opened, causing the negative pressure source to operate at a second intensity level, and indicating insufficient flow in response to determining that a pressure differential across a flow restrictor positioned in the fluid flow path satisfies a pressure differential threshold indicative of insufficient flow; and the excessive pressure test comprises: causing the valve to be closed, causing the negative pressure source to operate at a third intensity level, and indicating fault in a system configured to protect against unsafe negative pressure in the fluid flow path in response to determining that pressure in the fluid flow path satisfies a threshold indicative of unsafe negative pressure and the system configured to protect against unsafe negative pressure has not been activated.

20. The method of claim 19, wherein the test mode comprises performing at least two of the leak test, the flow test, or the excessive pressure test.

* * * * *